US012735252B2

(12) United States Patent
Liang et al.

(10) Patent No.: US 12,735,252 B2
(45) Date of Patent: Sep. 15, 2026

(54) METHODS, SYSTEMS, AND APPARATUS FOR A STRUCTURE FOR QUICK INSTALLATION AND REMOVAL OF SHUTTLE CAR HOUSING

(71) Applicant: INTELLIGRATED HEADQUARTERS, LLC, Mason, OH (US)

(72) Inventors: Liangqi Liang, Charlotte, NC (US); Tiecheng Qu, Charlotte, NC (US); Baoguo Wu, Charlotte, NC (US); Xiaojun Ma, Charlotte, NC (US); Zhao Xia Jin, Charlotte, NC (US); Kian Weng Teh, Charlotte, NC (US)

(73) Assignee: INTELLIGRATED HEADQUARTERS, LLC, Mason, OH (US)

( * ) Notice: Subject to any disclaimer, the term of this patent is extended or adjusted under 35 U.S.C. 154(b) by 264 days.

(21) Appl. No.: 18/503,769

(22) Filed: Nov. 7, 2023

(65) Prior Publication Data

US 2024/0166436 A1 May 23, 2024

(30) Foreign Application Priority Data

Nov. 21, 2022 (CN) ......................... 202211456408.0

(51) Int. Cl.
*B65G 1/04* (2006.01)

(52) U.S. Cl.
CPC ...................................... *B65G 1/04* (2013.01)

(58) Field of Classification Search
CPC ...... B61D 17/046; B62D 25/10; B62D 63/02; B65G 1/04

(Continued)

(56) References Cited

U.S. PATENT DOCUMENTS

| | | | | |
|---|---|---|---|---|
| 9,522,781 | B2 | 12/2016 | Hortig et al. | |
| 2017/0182924 | A1* | 6/2017 | Lendo ..................... | B60L 53/16 |
| 2019/0315236 | A1* | 10/2019 | Mere ....................... | B60L 53/65 |

FOREIGN PATENT DOCUMENTS

| | | | |
|---|---|---|---|
| CA | 2123815 | A1 | 11/1994 |
| CN | 112850569 | A | 5/2021 |

(Continued)

OTHER PUBLICATIONS

WO2015134529A1—Translation (Year: 2015).*

(Continued)

*Primary Examiner* — Terrell H Matthews
(74) *Attorney, Agent, or Firm* — Alston & Bird LLP

(57) ABSTRACT

Methods, apparatuses, systems, assemblies, and/or the like are provided. An example shuttle car assembly may include a shuttle car body configured to support one or more objects. The shuttle car body includes a chassis, one or more wheels connected to the chassis, one or more operating components connected to the chassis, one or more toolless body attachments. The shuttle car assembly may also include a shuttle car housing configured to at least partially house the one or more operating components of the shuttle car body. The shuttle car housing may include a shell with a top surface, a front surface, and two opposed side surfaces, and one or more toolless housing attachments. The one or more toolless body attachments and the one or more toolless housing attachments may be configured to engage to operatively connect the shuttle car body and the shuttle car housing.

18 Claims, 31 Drawing Sheets

(58) Field of Classification Search
USPC .......................................................... 414/277
See application file for complete search history.

(56) References Cited

FOREIGN PATENT DOCUMENTS

| | | | | | |
|---|---|---|---|---|---|
| WO | WO-2015134529 | A1 * | 9/2015 | ........... | B65G 1/0421 |
| WO | WO-2020096112 | A1 * | 5/2020 | ............... | G05D 1/43 |

OTHER PUBLICATIONS

WO2020096112A1—Translation (Year: 2020).*
CN Office Action Mailed on Dec. 14, 2022 for CN Application No. 202211456408, 1 page(s).
English Translation of CN Office Action dated Dec. 14, 2022 for CN Application No. 202211456408, 1 page(s).
Extended European Search Report Mailed on Apr. 9, 2024 for EP Application No. 23203189, 10 page(s).
IN Office Action Mailed on Jun. 30, 2026 for IN Application No. 202314067074, 10 page(s).

* cited by examiner 107A
106B
144
130
148B
134
136
106
102
148A 146B
134
130
106A
146A 132
128
105
138
118D 118E
118A
118B
152
118C 100
144
130
106
110
107
136
104
102
152
105

METHODS, SYSTEMS, AND APPARATUS FOR A STRUCTURE FOR QUICK INSTALLATION AND REMOVAL OF SHUTTLE CAR HOUSING

CROSS-REFERENCE TO RELATED APPLICATIONS

This application claims priority pursuant to 35 U.S.C. 119(a) to Chinese Application No. 202211456408.0, filed Nov. 21, 2022, which application is incorporated herein by reference in its entirety.

TECHNICAL FIELD

The present disclosure relates generally to housing for shuttle cars, and more particularly to a quick and tool-free installation of housing for shuttle cars.

BACKGROUND

In warehouse and other industrial environments, shuttle cars may be used as storage and/or retrieval systems. Shuttle cars may be configured to move along tracks, which may be positioned next to one or more storage units from which the shuttle cars may retrieve and/or transport products. Tracks and storage units may be distributed out horizontally and vertically, allowing for three-dimensional retrieval and/or transport of products by the shuttle cars.

Generally, storage units and tracks are positioned in as close proximity as possible to make the most efficient use of warehouse or industrial space. While this environment may provide increased efficiency for retrieving and/or transporting goods, it may also limit the amount of space available for technicians to operate on shuttle cars. This can lead to difficulties in instances where the shuttle car needs to be repaired or receive routine maintenance. For example, if an operating component of the shuttle car breaks down while the shuttle car is in a warehouse or industrial environment, there may be limited space for a technician to remove the housing to access the broken component. This problem can be compounded if unwieldy tools are required to remove or install the housing, or if removing the housing requires moving the housing to one side of the shuttle car. A need therefore exists for a shuttle car housing that can be quickly removed and installed without tools.

Through applied effort, ingenuity, and innovation, Applicant has solved problems relating to shuttle car housing installation by developing solutions embodied in the present disclosure, which are described in detail below.

BRIEF SUMMARY

In general, embodiments of the present disclosure provide methods, apparatuses, systems, computing devices, computing entities, and/or the like.

According to various embodiments, there is provided a shuttle car assembly including a shuttle car body configured to support one or more objects. In some embodiments, the shuttle car body includes a chassis; one or more wheels connected to the chassis; one or more operating components connected to the chassis; one or more toolless body attachments; and a shuttle car housing configured to at least partially house the one or more operating components of the shuttle car body. In some embodiments, the shuttle car housing includes a shell including a top surface, a front surface, and two opposed side surfaces; and one or more toolless housing attachments, wherein the one or more toolless body attachments and the one or more toolless housing attachments are configured to engage to operatively connect the shuttle car body and the shuttle car housing.

In some embodiments, the one or more toolless body attachments and the one or more toolless housing attachments include self-aligning mechanisms configured to at least partially align the shuttle car housing and the shuttle car body during engagement.

In some embodiments, the one or more toolless body attachments and the one or more toolless housing attachments include tension latching mechanisms, the tension latching mechanisms including at least one latch disposed on one of the shuttle car body or the shuttle car housing and at least one catch disposed on the other of the shuttle car body or the shuttle car housing, wherein the at least one latch is configured to engage the at least one catch.

In some embodiments, a first latch of the at least one latch and a first catch of the at least one catch are oriented along a shared vertical axis such that the first latch and the first catch are configured to engage with each other vertically when the shuttle car body is slidably engaged with the shuttle car housing.

In some embodiments, the one or more toolless body attachments and the one or more toolless housing attachments include one or more fasteners configured to fixedly attach the shuttle car body and the shuttle car housing.

In some embodiments, the one or more fasteners include one or more screws, wherein the one or more screws are configured to fixedly attach the shuttle car body and the shuttle car housing by extending through one or more holes in one of the shuttle car body or the shuttle car housing and thread into one or more screw holes in the other of the shuttle car body or the shuttle car housing.

In some embodiments, the one or more toolless body attachments and the one or more toolless housing attachments includes one or more non-tension mechanisms, the one or more non-tension latching mechanisms including one or more pin attachment mechanisms including at least one pin of one of the shuttle car body or the shuttle car housing configured to insert into at least one hole of the other of shuttle car body or the shuttle car housing.

In some embodiments, the one or more toolless body attachments or the one or more toolless housing attachments include at least one fastening mechanism and at least one tension latching mechanism, the at least one fastening mechanism including a fastener configured to engage a receiver to fixedly attach the shuttle car body and the shuttle car housing, the at least one tension latching mechanism including at least one latch configured to engage at least one catch.

In some embodiments, the at least one fastening mechanism includes two fastening mechanisms, wherein the at least one tension latching mechanism includes two tension latching mechanisms, and wherein each of the fastening mechanisms is configured to be disposed closer to an end of the shuttle car assembly than each of the tension latching mechanisms.

In some embodiments, the shuttle car body includes a bumper, wherein the one or more toolless body attachments is defined on the bumper, and wherein at least a portion of the shuttle car housing is configured to contact the bumper.

In some embodiments, the shuttle car housing is configured to be disposed over at least a portion of an axle of the shuttle car body.

In some embodiments, the shuttle car includes a second shuttle car housing, wherein the shuttle car housing is configured to be disposed at a first end of the shuttle car body and is configured to at least partially house a first plurality of operating components of the one or more operating components of the shuttle car body, wherein the second shuttle car housing is configured to be disposed at a second end of the shuttle car body and is configured to at least partially house a second plurality of operating components of the one or more operating components of the shuttle car body.

According to various embodiments, there is provided a shuttle car housing for a shuttle car assembly, the shuttle car housing including a shell including a top surface, a front surface, and two opposed side surfaces; and one or more toolless housing attachments, wherein the one or more toolless housing attachments are configured to operatively connect to one or more toolless body attachments of a shuttle car body to at least partially house the one or more operating components of the shuttle car body.

In some embodiments, the one or more toolless housing attachments are configured to operatively connect to one or more toolless body attachments of a shuttle car body without requiring tools.

In some embodiments, the one or more toolless body attachments include one or more self-aligning components configured to operatively connect to the one or more toolless body attachments of the shuttle car body.

In some embodiments, the one or more toolless body attachments include one or more tension latching components including a latch or a catch configured to operatively connect to the one or more toolless body attachments of the shuttle car body.

In some embodiments, the one or more toolless body attachments include one or more fastening mechanisms including a fastener or a receiver configured to operatively connect to the one or more toolless body attachments of the shuttle car body.

In some embodiments, the one or more toolless body attachments include at least one thumbscrew.

According to various embodiments, there is provided a method of toolless installation of a shuttle car housing to a shuttle car body, wherein the shuttle car body includes a chassis; one or more wheels connected to the chassis; one or more operating components connected to the chassis; one or more toolless body attachments, wherein the shuttle car housing includes: a shell including a top surface, a front surface, and two opposed side surfaces; and one or more toolless housing attachments. In some embodiments, the method includes securing the one or more toolless housing attachments of the shuttle car housing to the one or more toolless body attachments of the shuttle car body.

In some embodiments, the one or more toolless body attachments or the one or more toolless housing attachments includes at least one fastening mechanism and at least one tension latching mechanism, the at least one fastening mechanism including a fastener configured to engage a receiver to fixedly attach the shuttle car body and the shuttle car housing, the at least one tension latching mechanism including at least one latch configured to engage at least one catch.

The above summary is provided merely for purposes of summarizing some example embodiments to provide a basic understanding of some embodiments of the disclosure. Accordingly, it will be appreciated that the above-described embodiments are merely examples. It will be appreciated that the scope of the disclosure encompasses many potential embodiments in addition to those here summarized, some of which will be further described below.

BRIEF DESCRIPTION OF THE SEVERAL VIEWS OF THE DRAWING(S)

Having thus described the disclosure in general terms, reference will now be made to the accompanying drawings, which are not necessarily drawn to scale, and wherein:

Figure 6A:
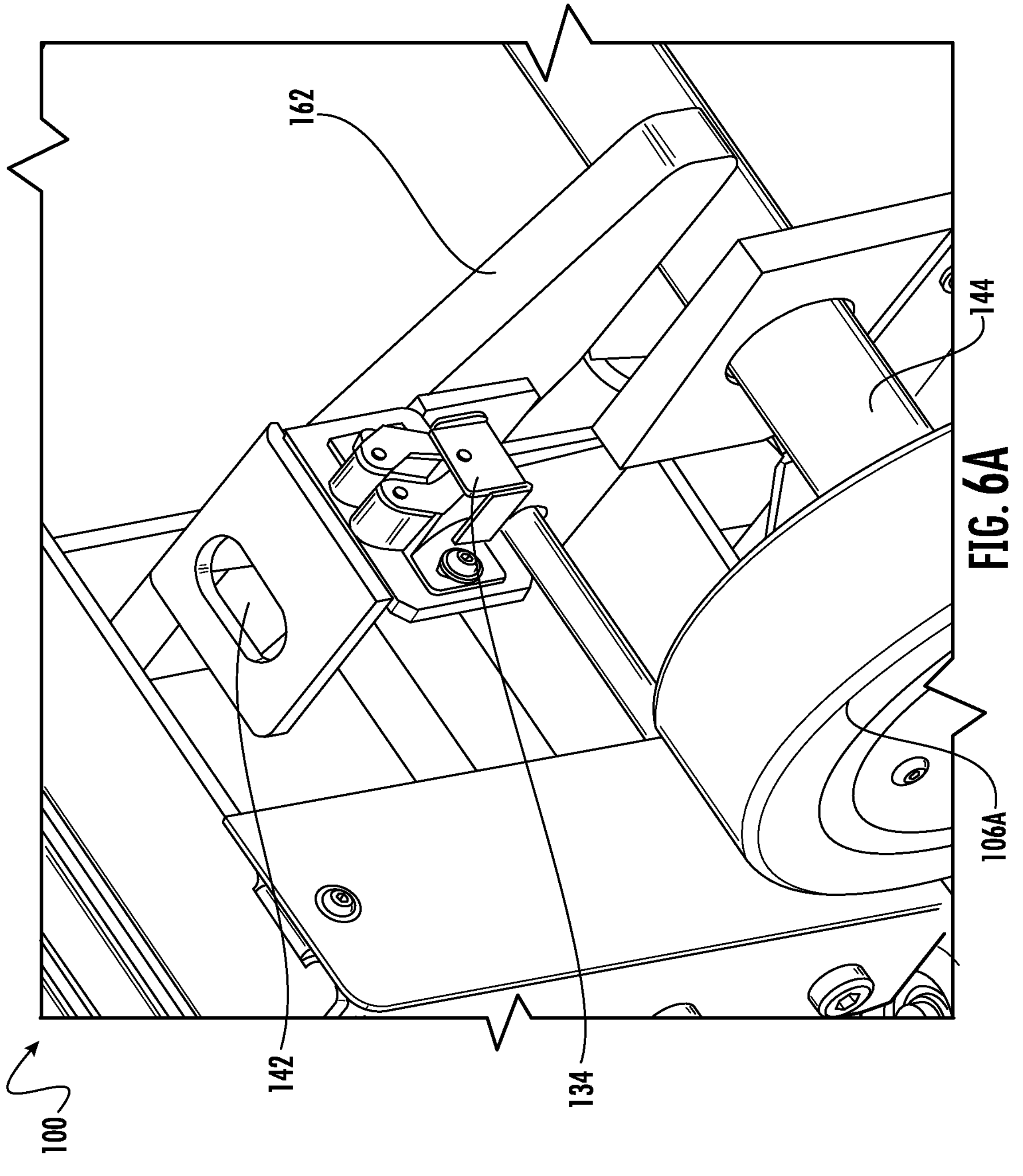
FIG. 6A is an angled view of an example shuttle car housing with a dowel hole in accordance with various embodiments of the present disclosure.
Figure 6B:
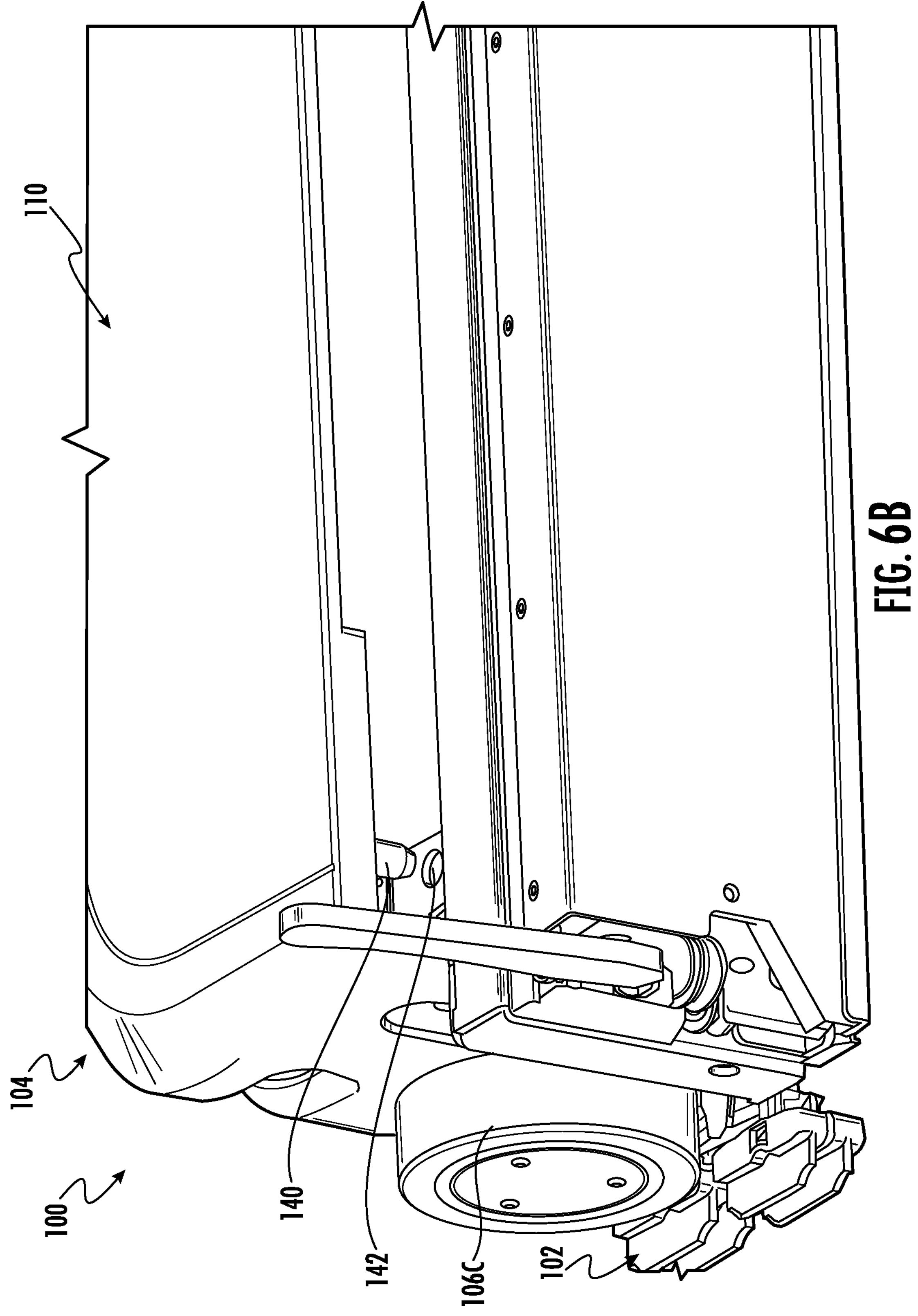
FIG. 6B is an angled view of an example shuttle car housing with an example dowel and dowel hole in accordance with various embodiments of the present disclosure.
Figure 6C:
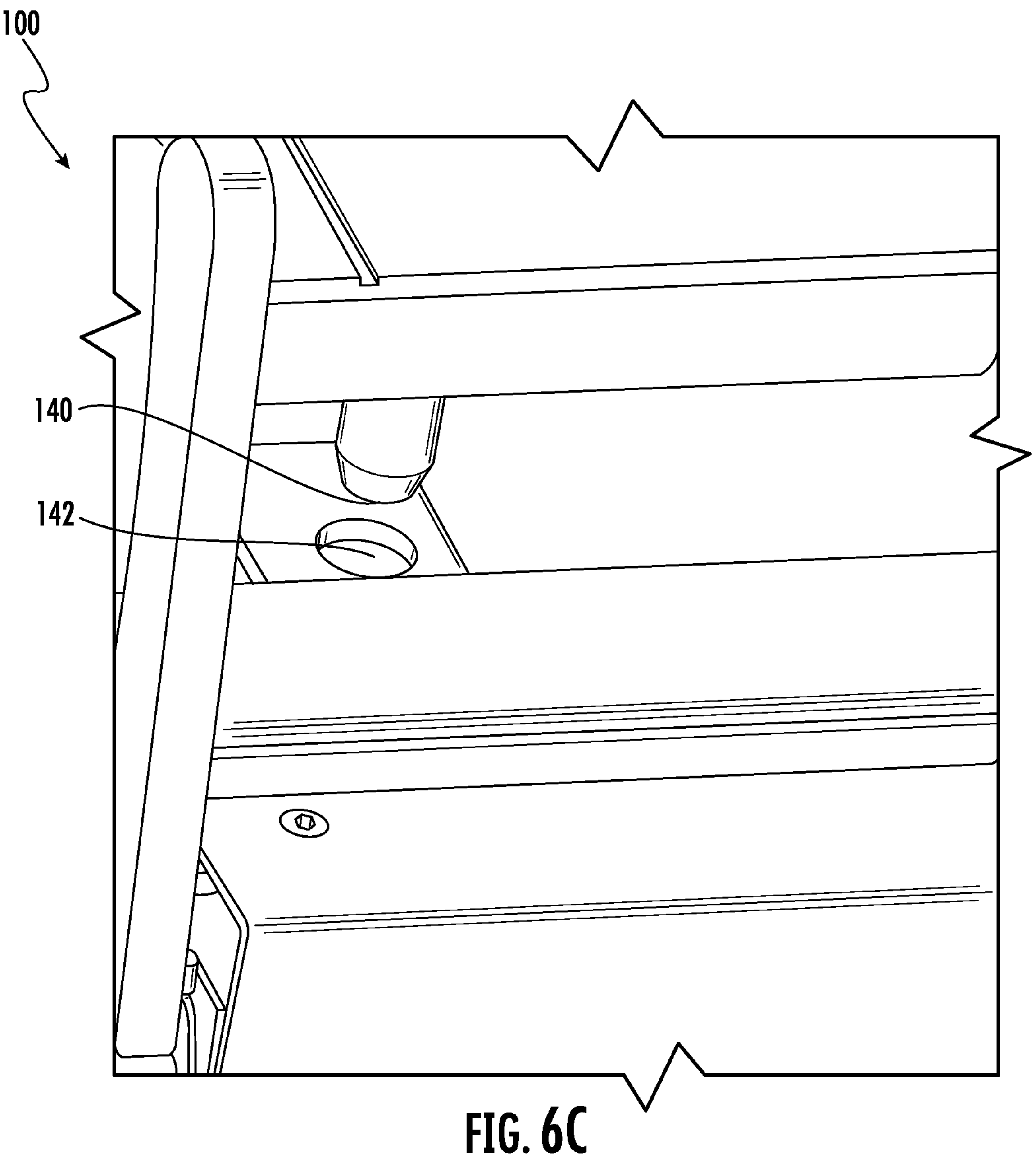
Figure 6D:
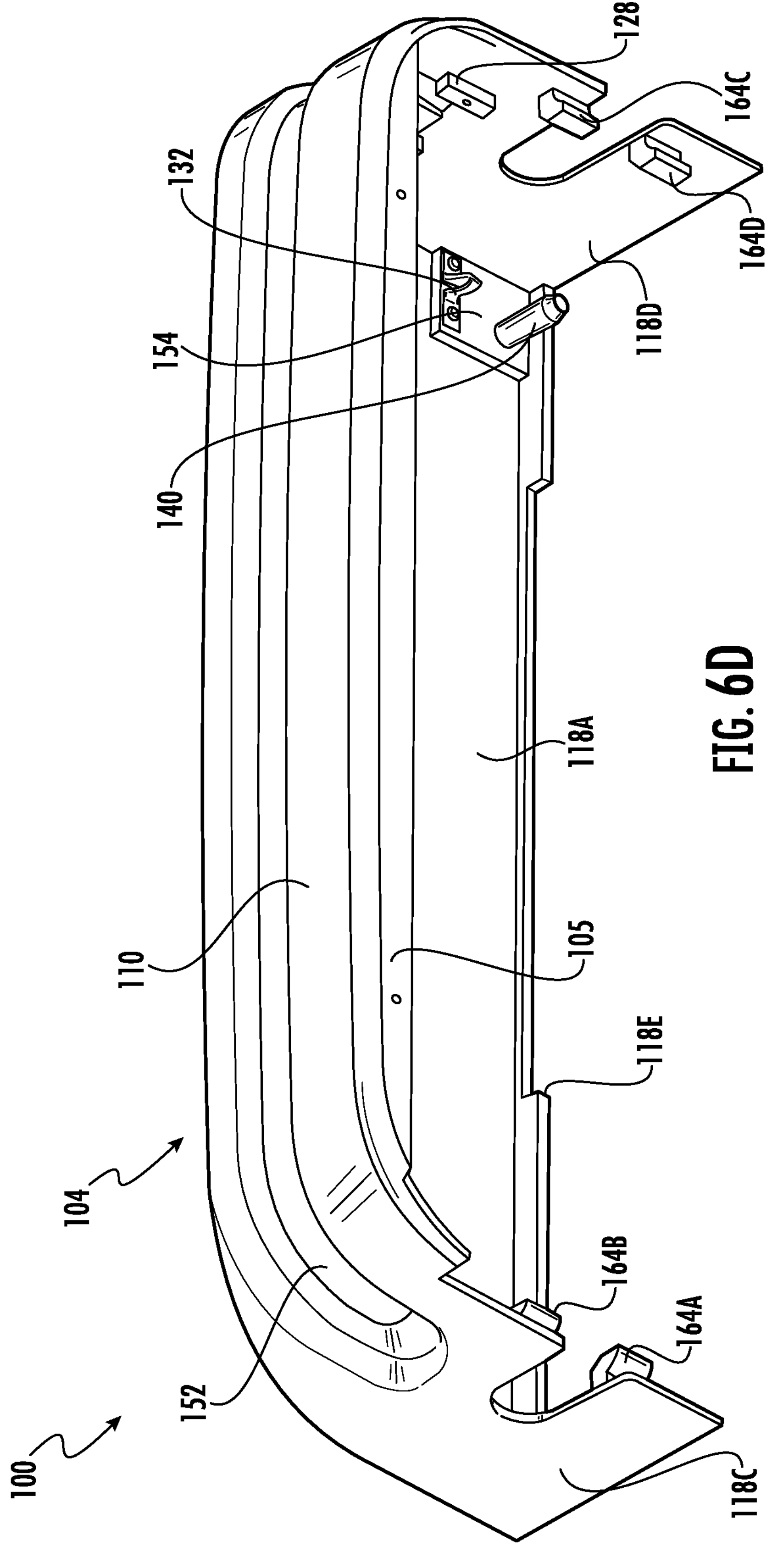
Figure 6E:
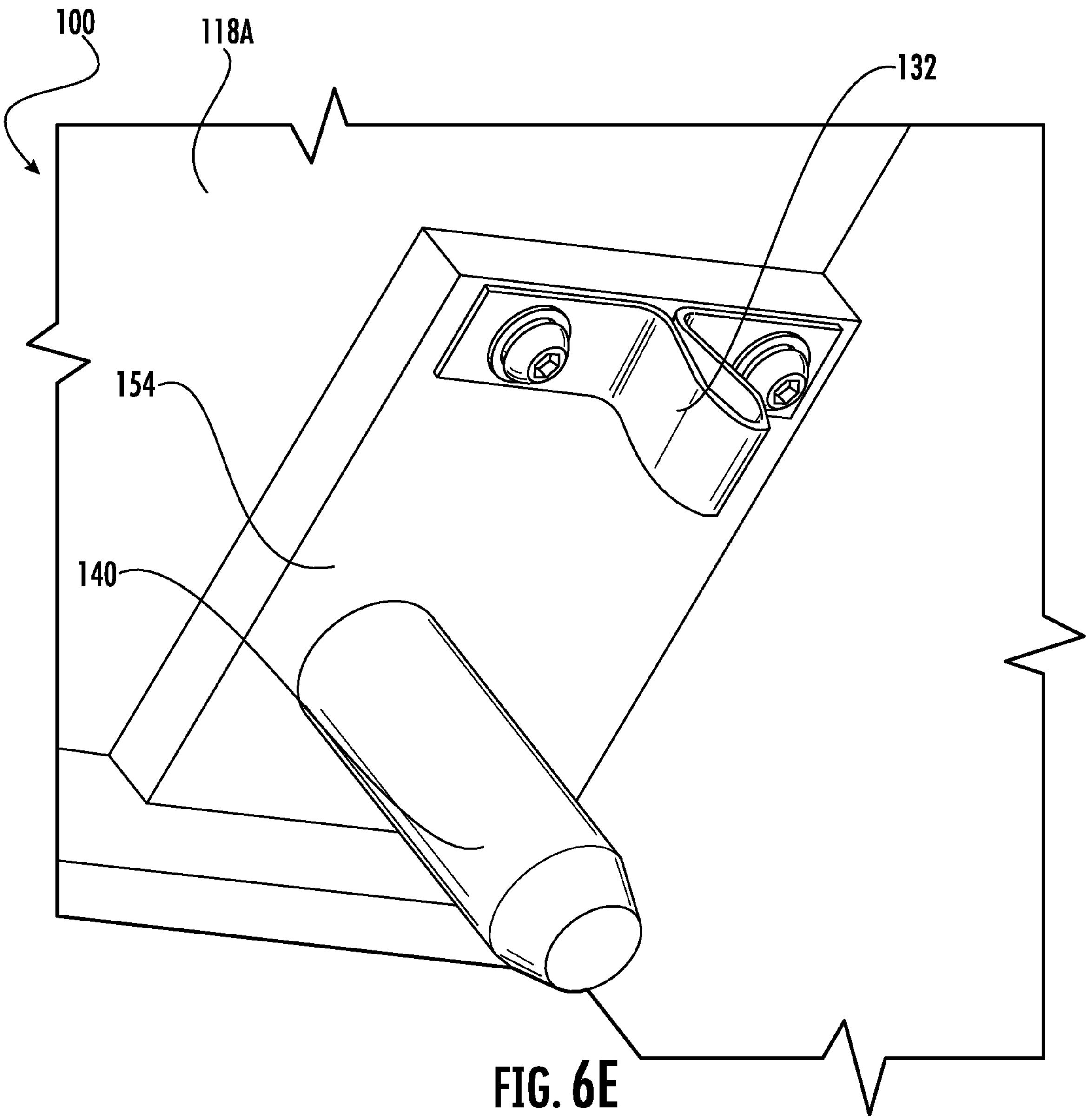
Figure 7A:
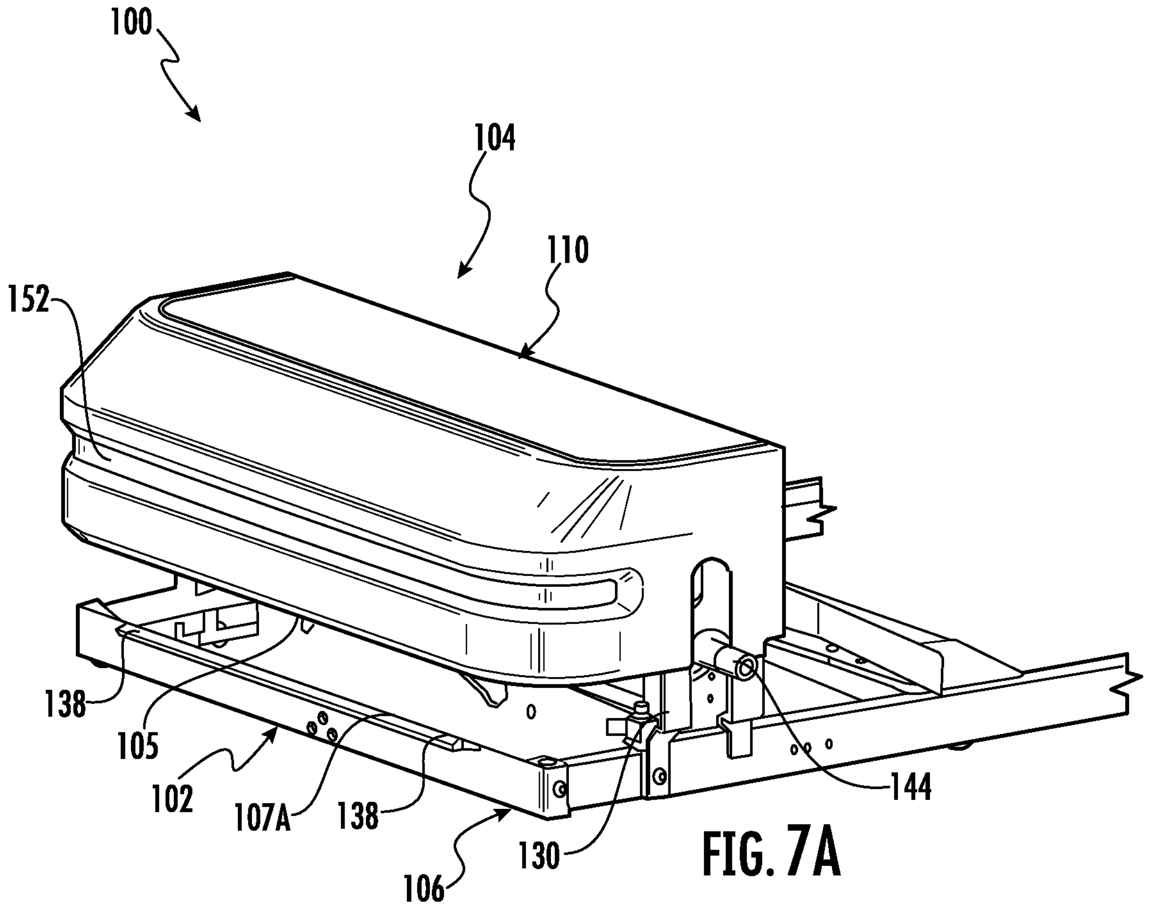
Figure 7B:
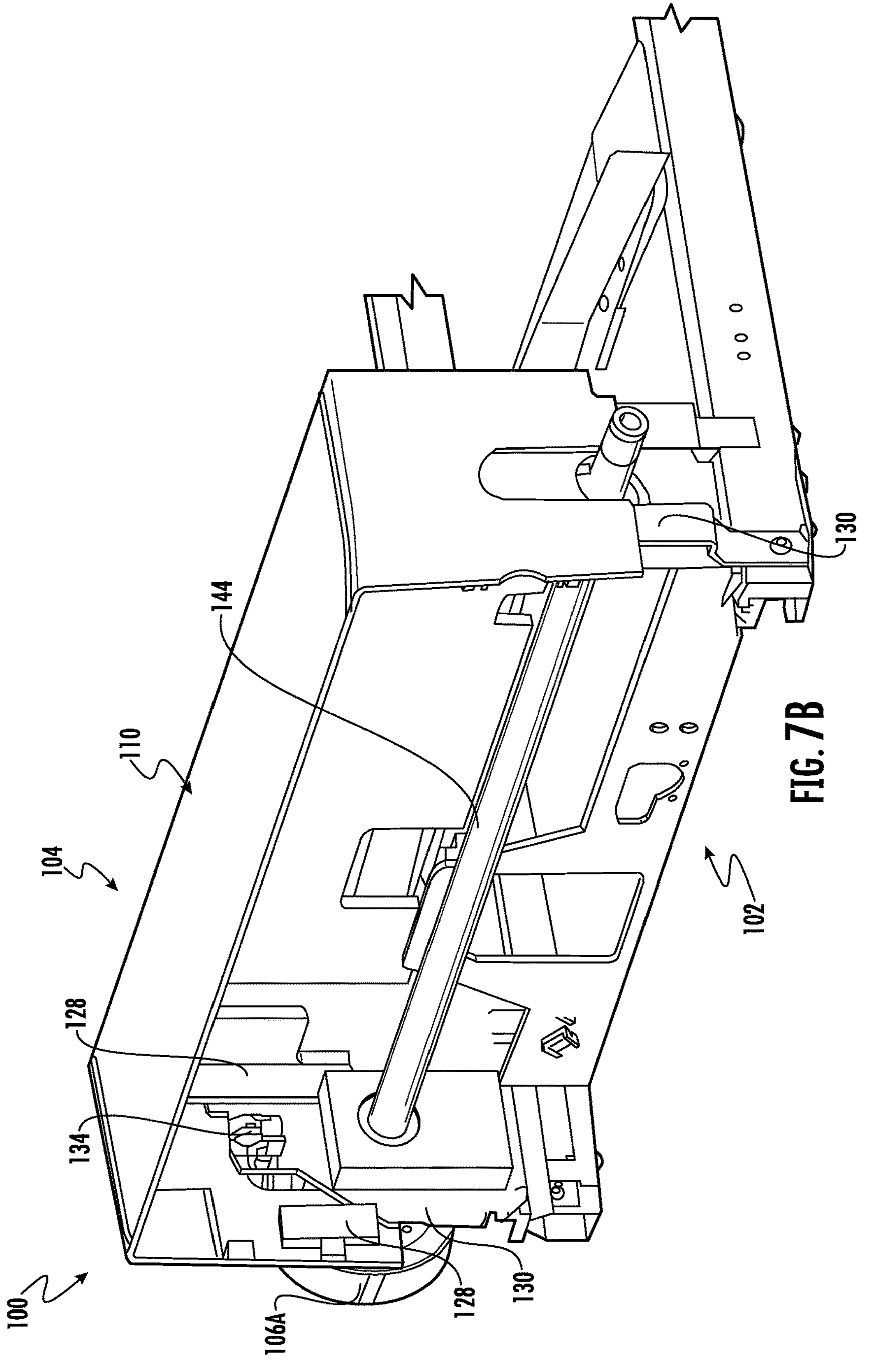
Figure 7C:
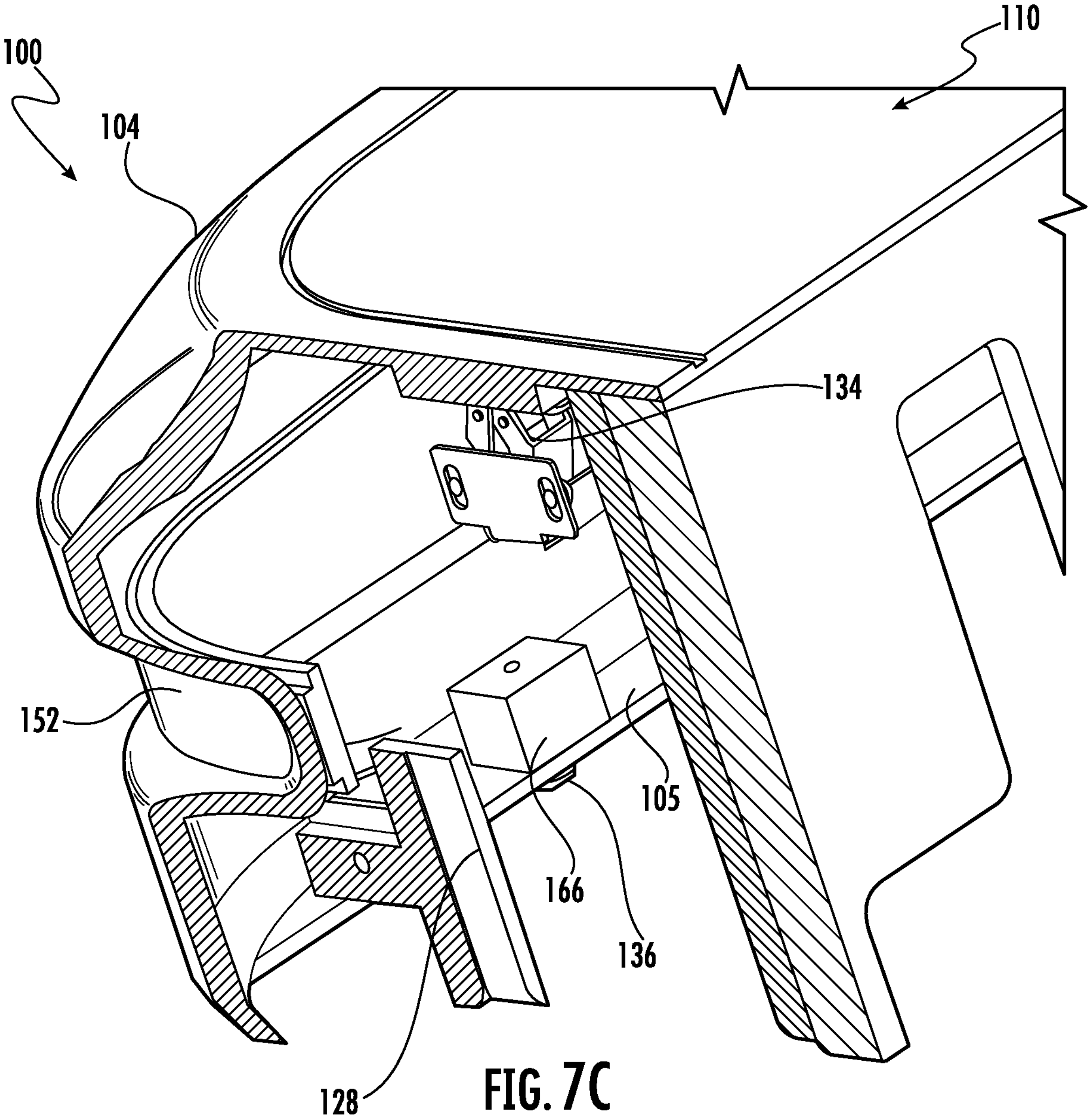
Figure 8A:
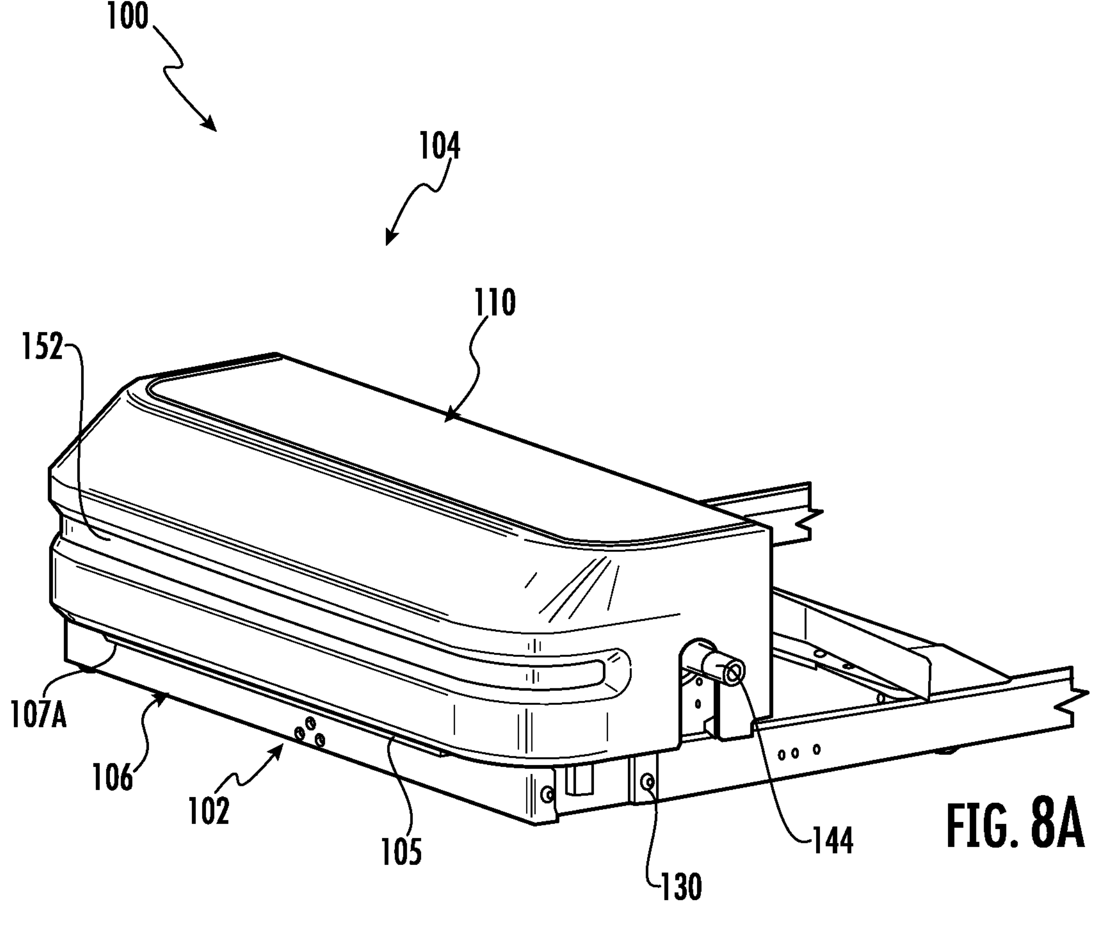
Figure 8B:
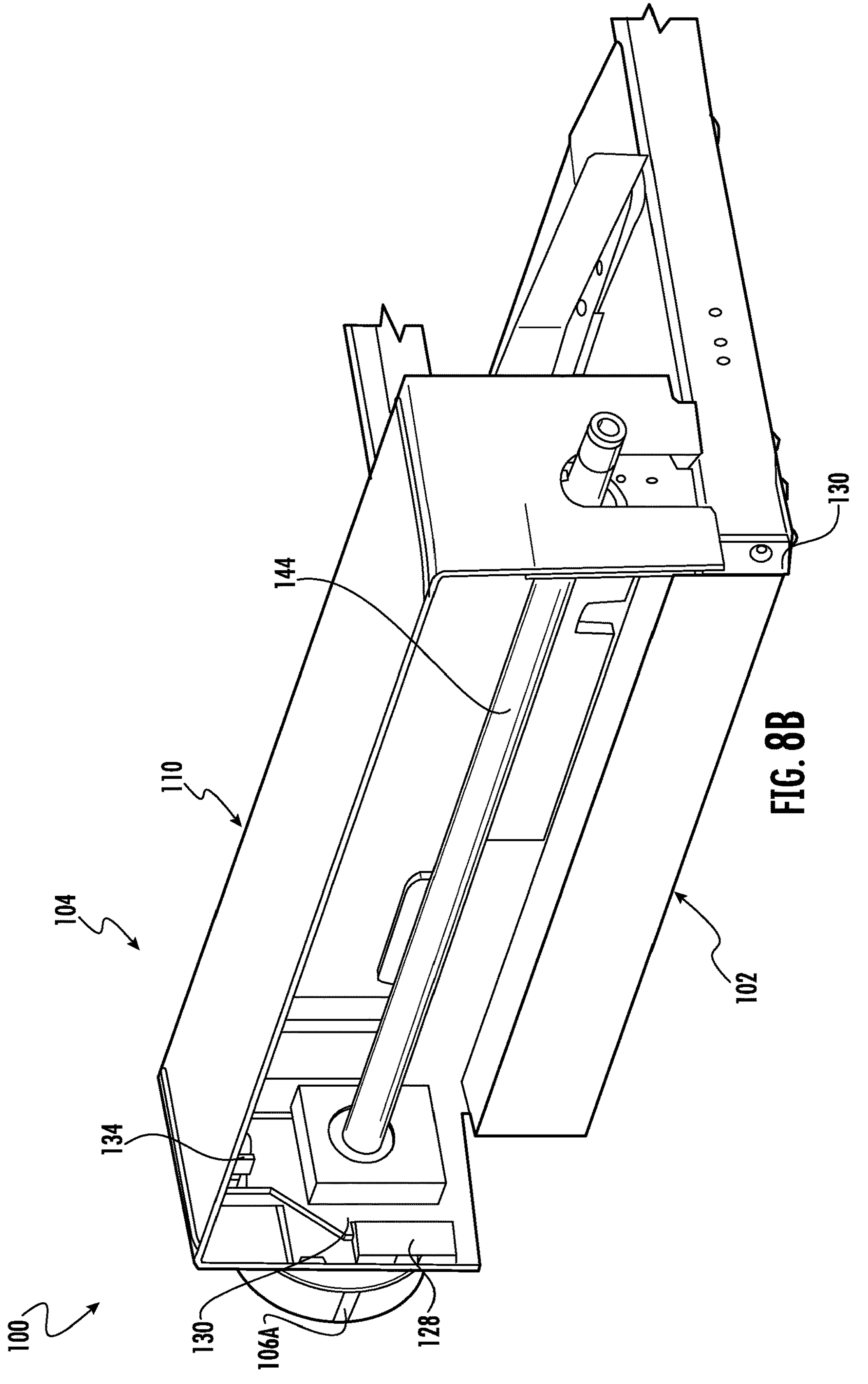
Figure 8C:
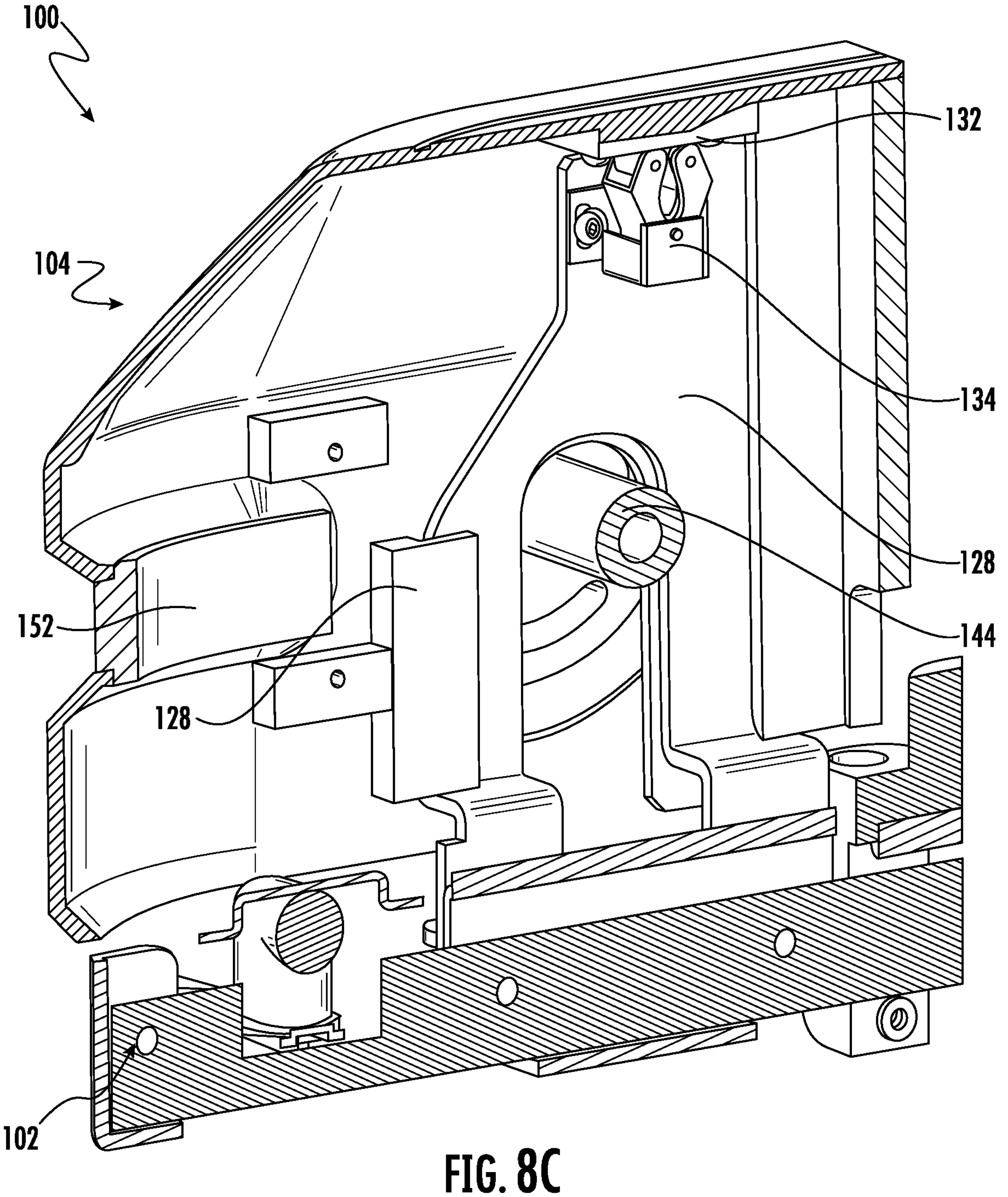
Figure 9:
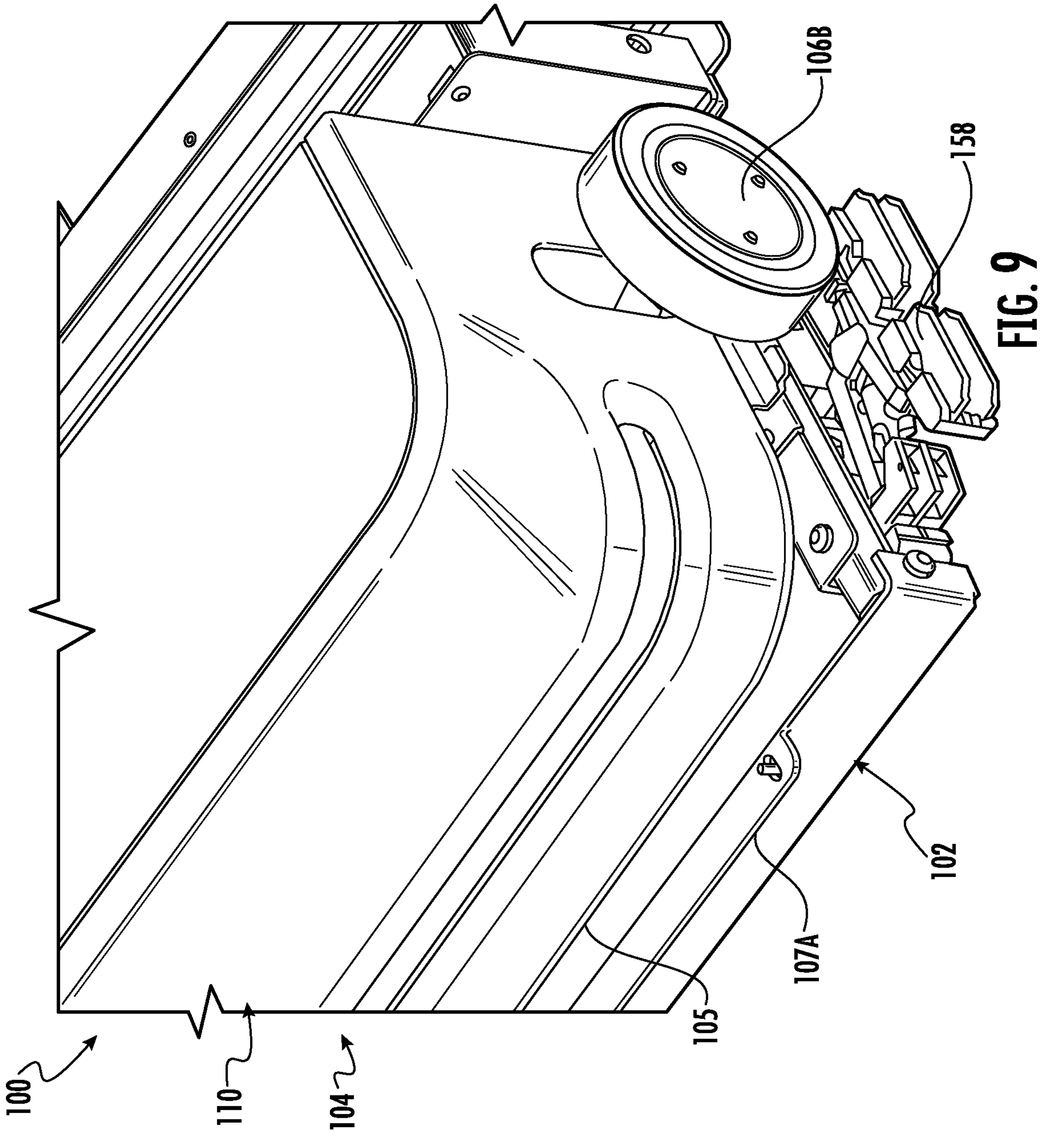
Figure 10A:
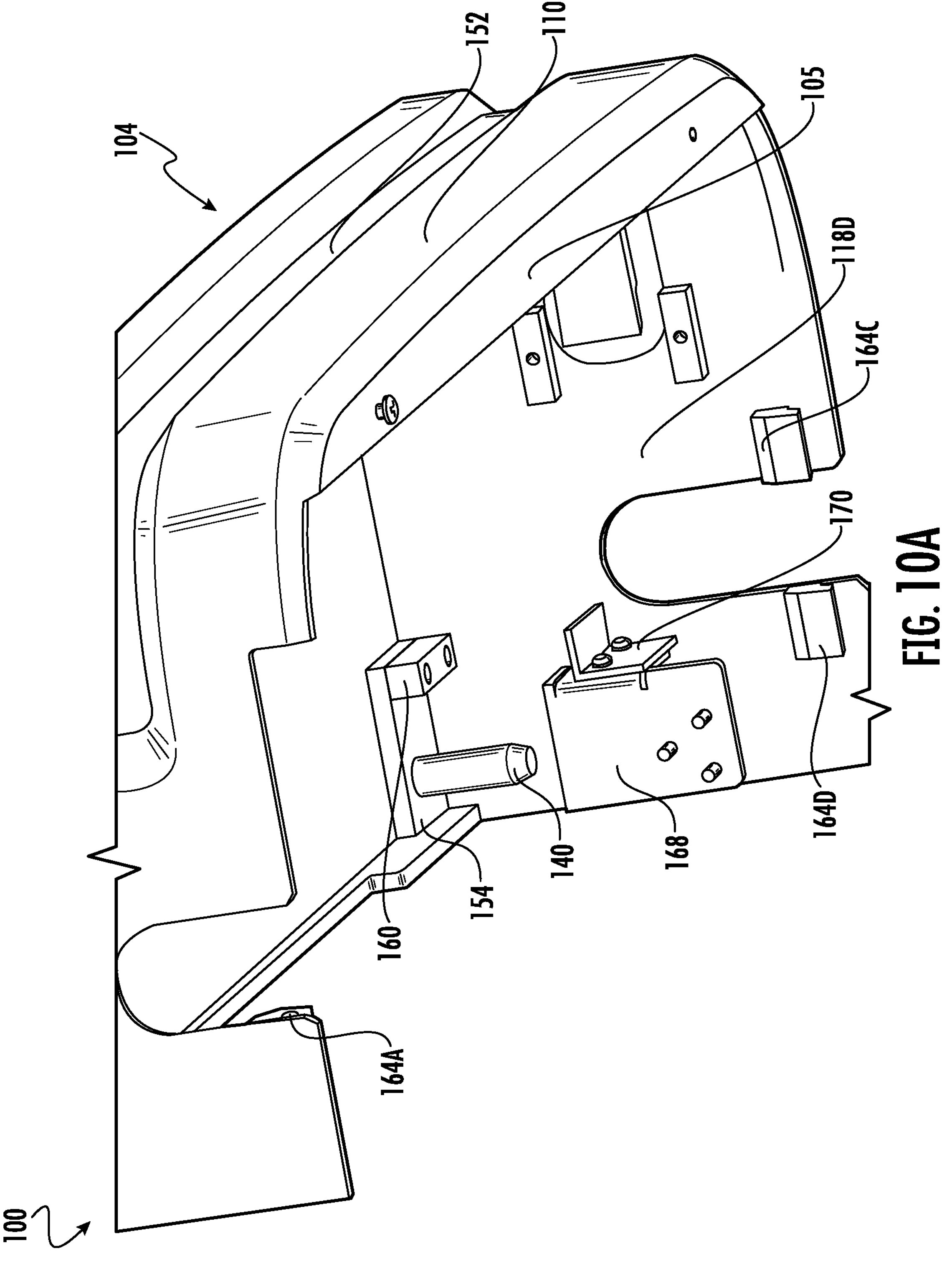
Figure 10B:
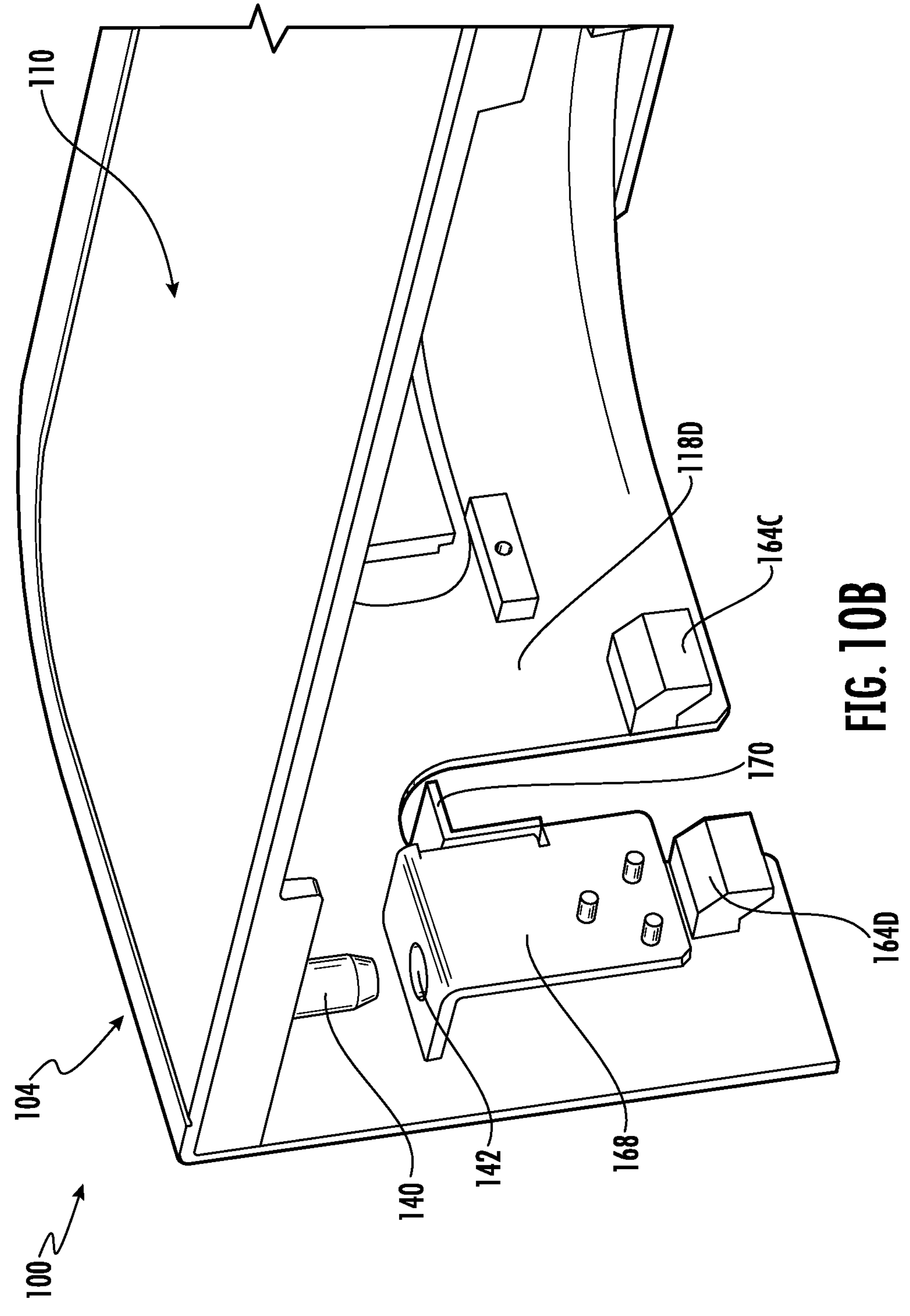
Figure 10C:
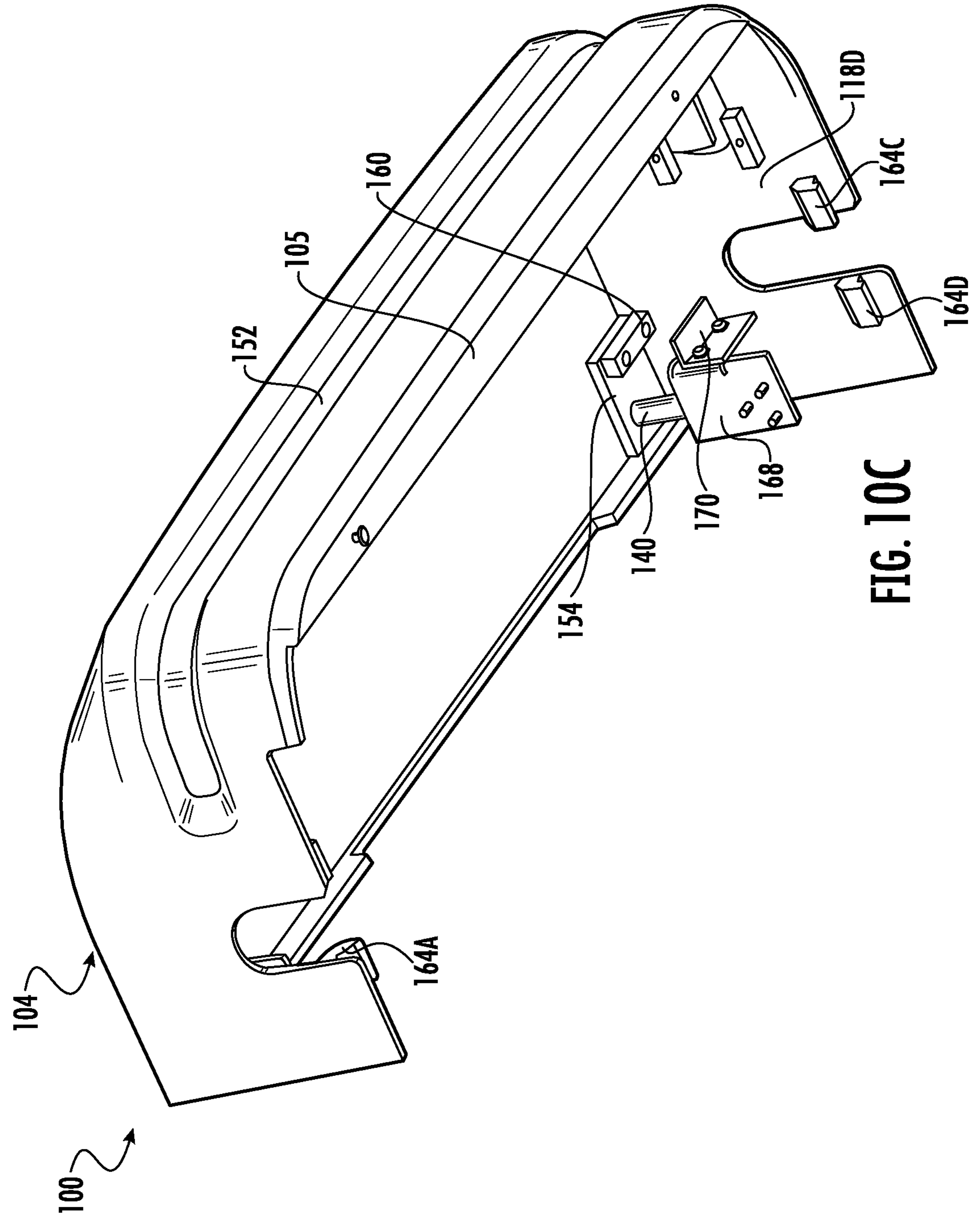
Figure 10D:
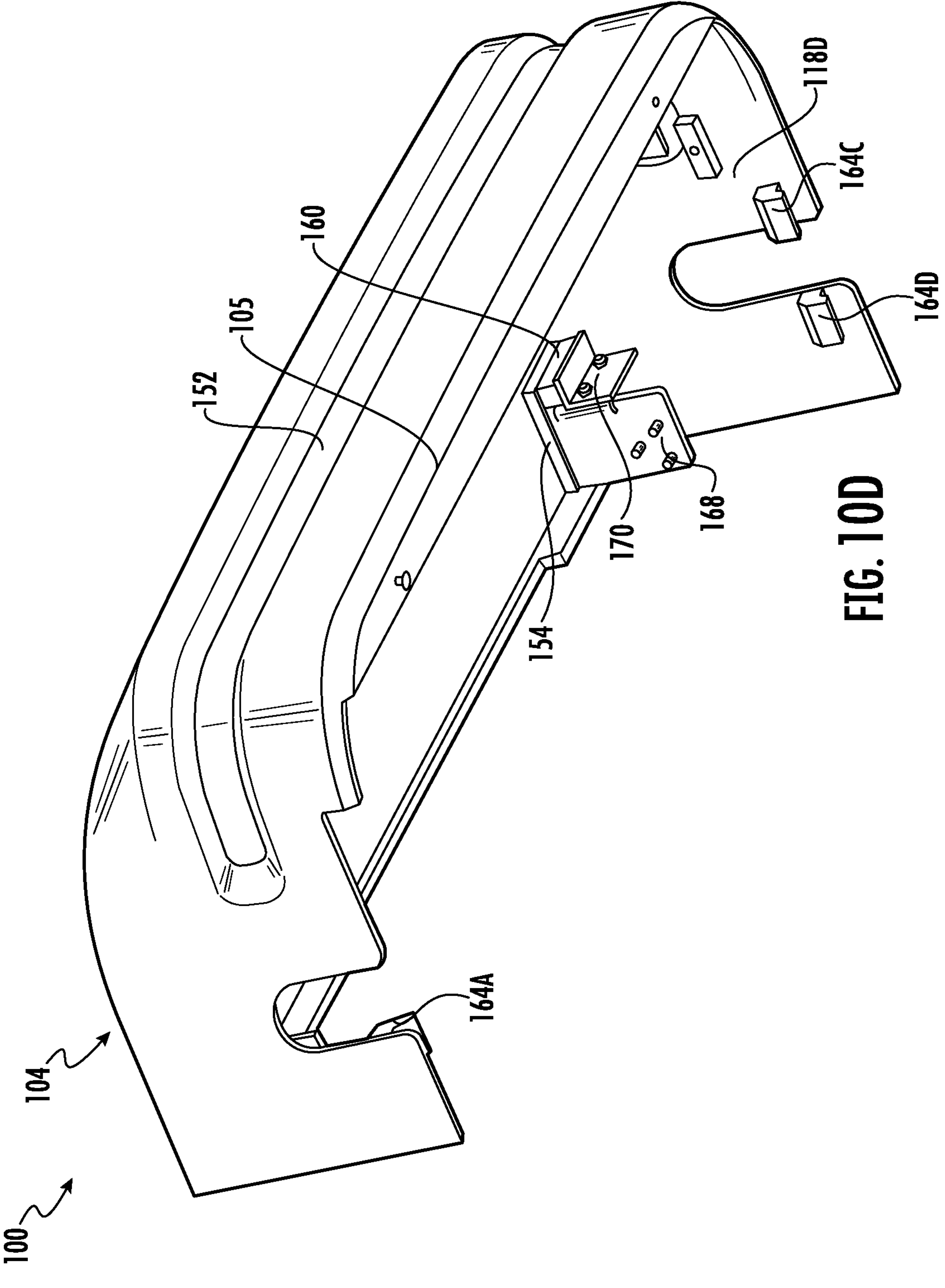
Figure 10E:
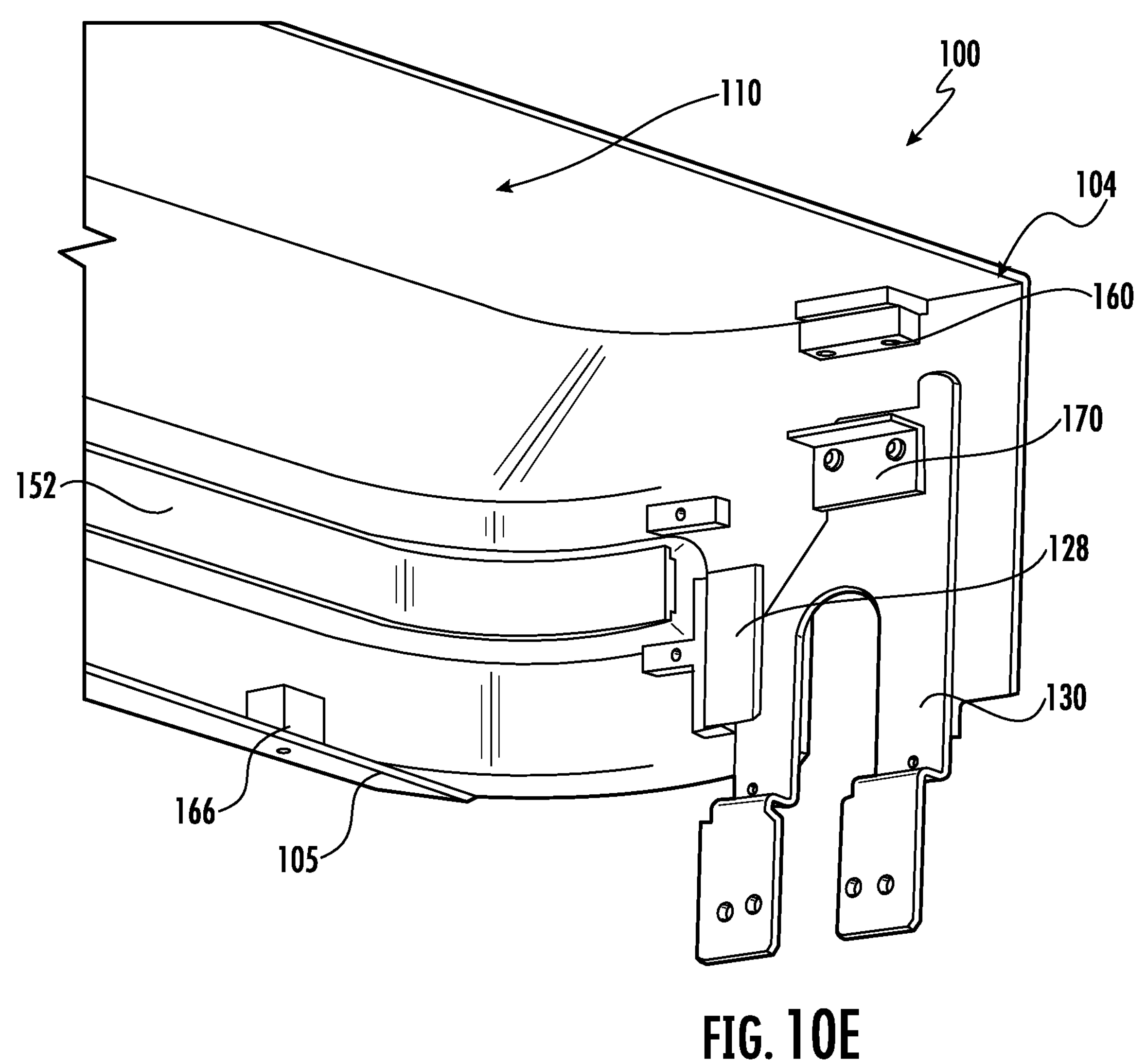
Figure 10F:
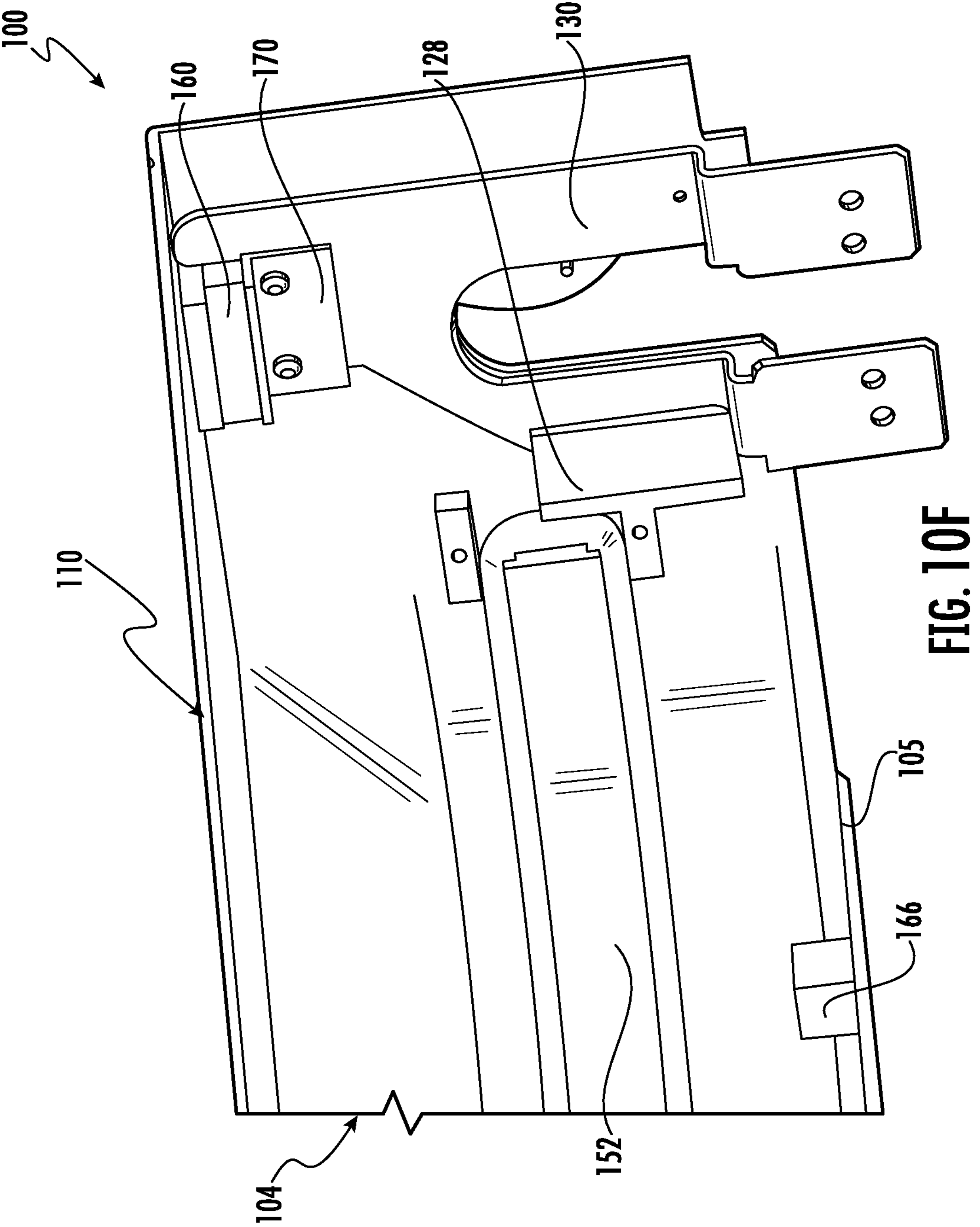
Figure 11:
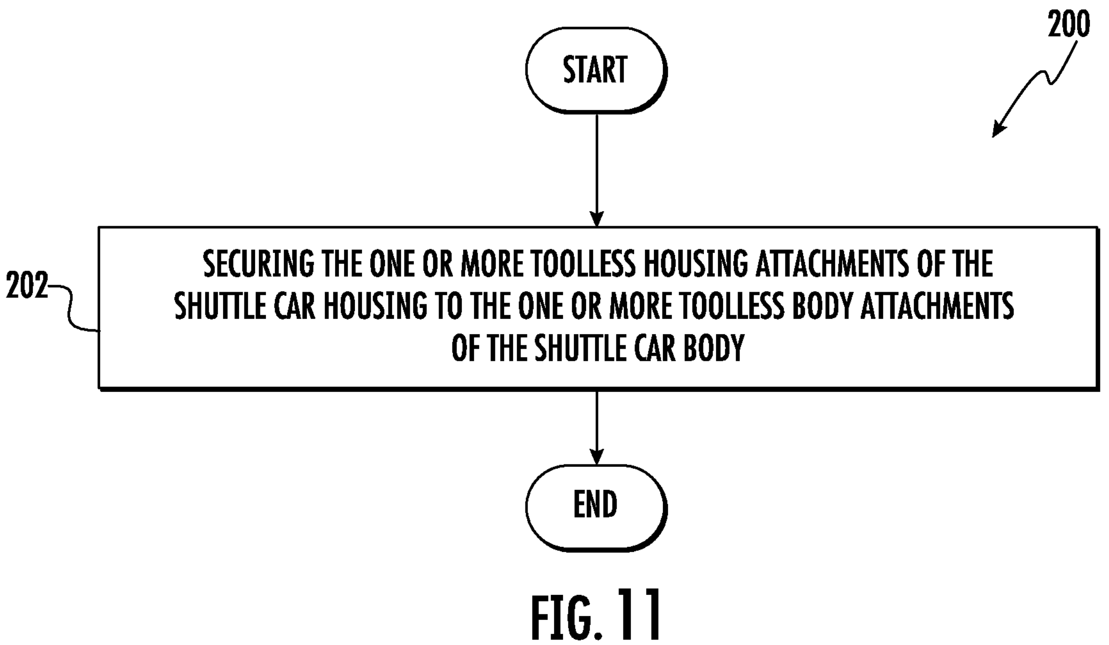

FIG. 6C a first angled view of an example shuttle car housing with an example dowel and latch in accordance with various embodiments of the present disclosure;

FIG. 6D is a first angled view of an example shuttle car housing with an example dowel and latch in accordance with various embodiments of the present disclosure;

FIG. 6E is a second angled view of an example shuttle car housing with an example dowel and latch in accordance with various embodiments of the present disclosure;

FIG. 7A is an angled view of an example shuttle car assembly in a first position in accordance with various embodiments of the present disclosure;

FIGS. 7B-7C are cross-sectional views of an example shuttle car assembly in a first position in accordance with various embodiments of the present disclosure;

FIG. 8A is an angled view of an example shuttle car housing assembly in a second position in accordance with various embodiments of the present disclosure;

FIGS. 8B-8C are cross-sectional views of an example shuttle car housing assembly in a second position in accordance with various embodiments of the present disclosure;

FIG. 9 is an angled view of an example shuttle car housing with an example current collector in accordance with various embodiments of the present disclosure;

FIG. 10A-F are angled views of an example shuttle car housing with an example magnet design in accordance with various embodiments of the present disclosure; and FIG. 11 is a flow chart illustrating an example method for installation of an example shuttle car housing in accordance with various embodiments of the present disclosure.

DETAILED DESCRIPTION OF SOME EXAMPLE EMBODIMENTS

Various embodiments of the present disclosure will be described more fully hereinafter with reference to the accompanying drawings, in which some, but not all embodiments of the disclosure are shown. Indeed, this disclosure may be embodied in many different forms and should not be construed as limited to the embodiments set forth herein; rather, these embodiments are provided so that this disclosure will satisfy applicable legal requirements. The term "or" (also designated as "/") is used herein in both the alternative and conjunctive sense, unless otherwise indicated. The terms "illustrative" and "exemplary" are used to be examples with no indication of quality level. Like numbers may refer to like elements throughout. The phrases "in one embodiment," "according to one embodiment," and/or the like generally mean that the particular feature, structure, or characteristic following the phrase may be included in at least one embodiment of the present disclosure and may be included in more than one embodiment of the present disclosure (importantly, such phrases do not necessarily may refer to the same embodiment). As used herein, terms such as "front," "rear," "top," "vertical", "horizontal", etc. are used for explanatory purposes in the examples provided below to describe the relative positions of certain components or portions of components relative to a local reference frame of a shuttle car assembly using an arbitrary global reference frame.

Overview

Shuttle cars are used, for example, in various warehouse and industrial environments, including, for example, to retrieve goods from warehouse storage and to transport goods within a warehouse. Shuttle cars may run on tracks within an example warehouse. The tracks may run adjacent to example storage units, allowing the shuttle cars to traverse an example warehouse and retrieve goods from storage units. Efficient warehouse management may require that the tracks and storage units are positioned closely together to pack as many storage units as possible within an example warehouse, while still allowing for tracks and shuttle cars to retrieve and transport goods within the example warehouse. One consequence of this compact distribution of tracks and storage units is that there may be limited space for technicians to work on shuttle cars within an example warehouse. Furthermore, technicians may often be required to work on the shuttle cars without tools because the tools may require space that is not available in the compact warehouse environment and because the technicians may not have tools on their person and storing the tools within the warehouse would cut down on valuable space that could be used for storing goods or laying track. Embodiments of the present disclosure relate to shuttle car assemblies, shuttle car housing, and methods to install shuttle car housing on shuttle car assemblies.

Various embodiments are described that attempt to allow quick and tool-free installation of a shuttle car housing on a shuttle car assembly. In various embodiments, a shuttle car assembly may include a shuttle car body and a shuttle car housing. The shuttle car body may include a chassis, a one or more wheels, and one or more operating components. The shuttle car housing may include a shell with a front surface, a top surface, opposed side surfaces, and/or a rear surface. The shuttle car body and the shuttle car housing may each include toolless attachments that thereby connect the shuttle car body and the shuttle car housing. The shuttle car body may include one or more toolless body attachments, and the shuttle car housing may include one or more toolless housing attachments. The toolless attachments may enable quick removal and re-attachment of the housing(s) from/onto the shuttle car body while the shuttle car remains on the rails and without requiring any tools to be used by the technician.

In some embodiments, a technician may slidably attach the shuttle car housing to the shuttle car body. In some embodiments, the shuttle car housing may slidably attach by moving vertically down onto the shuttle car body and slidably detach by moving vertically up from the shuttle car body. In some embodiments, the shuttle car housing may be at least partially rotated during installation.

In some embodiments, the shuttle car housing may include one or more self-aligning components and/or the shuttle car body may include one or more self-aligning components. In some embodiments, a self-aligning mechanism may refer to one or more self-aligning components and one or more corresponding attachments that cooperate with the self-aligning component(s). The self-aligning mechanism may refer to the components on both the shuttle car housing and the shuttle car body (if any) that facilitate self-alignment. The self-aligning component(s) the shuttle car housing and/or shuttle car body may be configured to at least partially align the shuttle car housing and the shuttle car body during engagement. In some embodiments, the alignment may be along one or more axes (e.g., vertical alignment and/or horizontal alignment in one or more directions). The self-aligning mechanisms may include one or more centering mechanisms that direct an engaging component into a receiving component in a precise, repeatable position. For example, the shuttle car housing may include one or more guide slots that slidably attach to one or more mounting plates on the shuttle car body. In some embodiments, the shuttle car housing may include guide slots and the shuttle car body may include mounting plates, and the technician may slidably attach the housing to the body by sliding the guide slots onto the mounting plates. When the technician needs to remove the housing (e.g., to repair an operating component on the shuttle car body), the technician may slidably detach the housing from the body by sliding the guiding slots out of the mounting plates. In some embodiments, the self-aligning mechanisms may include a fastening mechanism and/or tension latching mechanism (e.g., a single set of components may both engage and self-align).

In some embodiments, the shuttle car housing may include one or more tension latching mechanisms that operably connect to one or more tension latching mechanisms on the shuttle car body. In some embodiments, the tension latching mechanisms includes any engaging component and receiving component configured to removably couple to maintain engagement under at least some removal forces while permitting disengagement without actuation or other toggling, unscrewing, or separate unfastening action. For example, the shuttle car housing may include one or more latches that operably connect to one or more catches on the shuttle car body. In some embodiments, the latches may engage the catches, and the catches may prevent removal of the latches up to a threshold removal force. In some embodiments, the shuttle car housing may include one or more latches and the shuttle car body may include one or more catches (such as roller catches), and the technician may slide the shuttle car housing onto the shuttle car body such that the one or more latches and the one or more catches operably connect, thereby securing the shuttle car housing to the shuttle car body. In some embodiments, the technician may press on both sides of the shuttle car housing to further secure the latches to the catches. When the technician needs to remove the housing, the technician may slidably detach the latches from the catches by applying upwards force that disengages the latch from the catch.

In some embodiments, the shuttle car housing may include one or more fastening mechanisms that fixedly attach to one or more fastening mechanisms on the shuttle car body. In some embodiments, the fastening mechanisms may include any type of fastener configured to engage a corresponding receiver or any other removable, rigid attachment, including, but not limited to, screws and screw holes; nuts, bolts, and corresponding holes; clamps; latches that provide rigid affixation; set screws; keyways and shaft keys; pins transverse to a direction of removal; toggles; quarter turn fasteners; and/or the like. For example, the shuttle car housing may include one or more screw holes that align with one or more screw holes on the shuttle car body. After the shuttle car housing has been slidably connected to the shuttle car body, a technician may secure the shuttle car housing to the shuttle car body by aligning the screw holes on the shuttle car housing with the screw holes on the shuttle car body, then pushing screws through the aligned screw holes of the shuttle car housing and the shuttle car body. When the technician needs to remove the housing, the technician may unscrew the screws by hand and slidably detach the shuttle car housing from the shuttle car body, enabling access to one or more operating components on the shuttle car body.

In some embodiments, the shuttle car housing and shuttle car body may include one or more non-tension attachment mechanisms, such as one or more pins that operably connect to one or more receiving holes. In some embodiments, the non-tension attachment mechanisms may provide engagement in a plurality of directions while not providing resistance in at least one direction of motion. In some embodiments, a pin may be disposed in a corresponding hole to prevent movement within a plane, while permitting removal of the pin back out of the hole. Either the shuttle car housing or the shuttle car body may include such a pin while the other may include a receiving hole. For example, in some embodiments, the shuttle car housing may include one or more dowels that a technician may insert into one or more dowel holes on the shuttle car body, thereby forming a pin attachment (secured by friction) between the shuttle car housing and the shuttle car body. When the technician needs to remove the housing, the technician may apply upwards pressure to overcome the friction between the dowel and the dowel hole and thereby detach the shuttle car housing from the shuttle car body.

In some embodiments, the shuttle car housing and the shuttle car body may include one or more magnetic attachment mechanisms, such as one or more magnets disposed on the shuttle car body and one or more corresponding magnets disposed on the shuttle car housing, where the magnets on the shuttle car body and the magnets on the shuttle car housing have polarities that attract each other. In some embodiments, magnets may be disposed on only one of the shuttle car body or the shuttle car housing, while one or more metal sheets are disposed on the other structure. For example, a magnet may be fixedly attached to the shuttle car housing, while one or more metal sheets are disposed on the shuttle car body and when a technician slides the shuttle car housing onto the shuttle car body, the magnets may be attracted to and form a magnetic attachment with the one or more metal sheets. In this example, when the technician wants to remove the shuttle car housing from the shuttle car body, the technician may apply a force to overcome the magnetic attraction of the one or more magnets and the one or more metal sheets, thereby overcoming the magnetic attachment shuttle car housing and the shuttle car body. In some embodiments, the magnetic attachment mechanisms may replace the one or more tension latching mechanisms. However, in other embodiments, the magnetic attachment mechanisms may be used in conjunction with the tension latching mechanisms.

In various embodiments, these various toolless attachment mechanisms may be combined and reoriented in a variety of ways. For example, the shuttle car housing and the shuttle car body may each include one or more self-aligning mechanisms, one or more tension latching mechanisms, one or more fastening mechanisms, and one or more non-tension attachment mechanisms. In some embodiments, the toolless attachment mechanisms may be interchanged between the shuttle car housing and the shuttle car body. For example, the shuttle car housing may include one or more mounting plates and the shuttle car body may include one or more guide slots; the shuttle car housing may include one or more catches and the shuttle car body may include one or more latches; and the shuttle car housing may include one or more dowel holes and the shuttle car may include one or more dowels. In some embodiments, the toolless attachment mechanisms may be combined. For example, in some embodiments, one or more catches may be disposed on one or more mounting plates, either on the shuttle car housing or the shuttle car body, and the one or more catches and the one or more mounting plates may be aligned with and operably connected to one or more latches and one or more guide slots, respectively.

Figure 1:
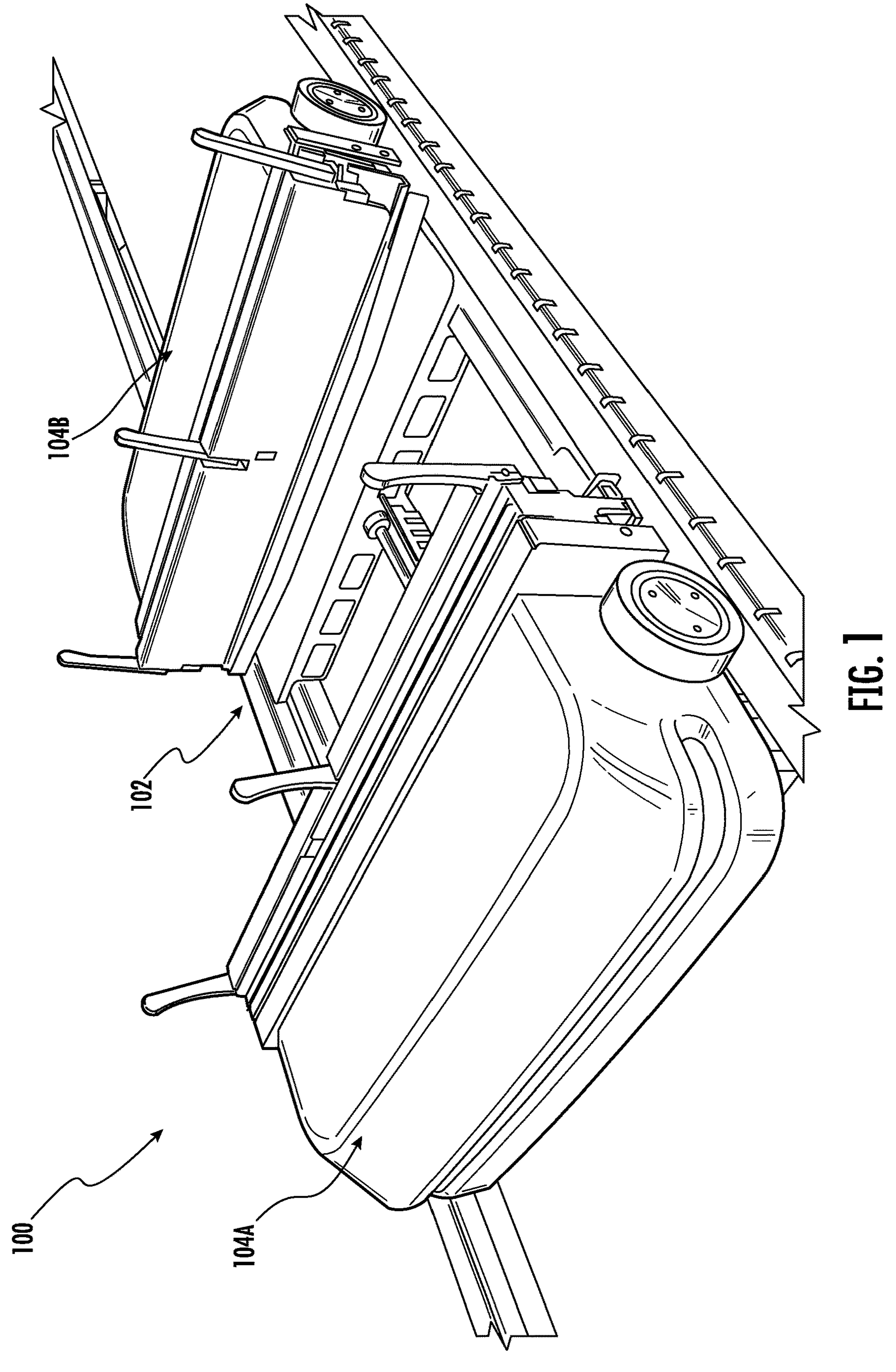
FIG. 1 is a first angled view of an example shuttle car assembly in accordance with various embodiments of the present disclosure.
Figure 2:
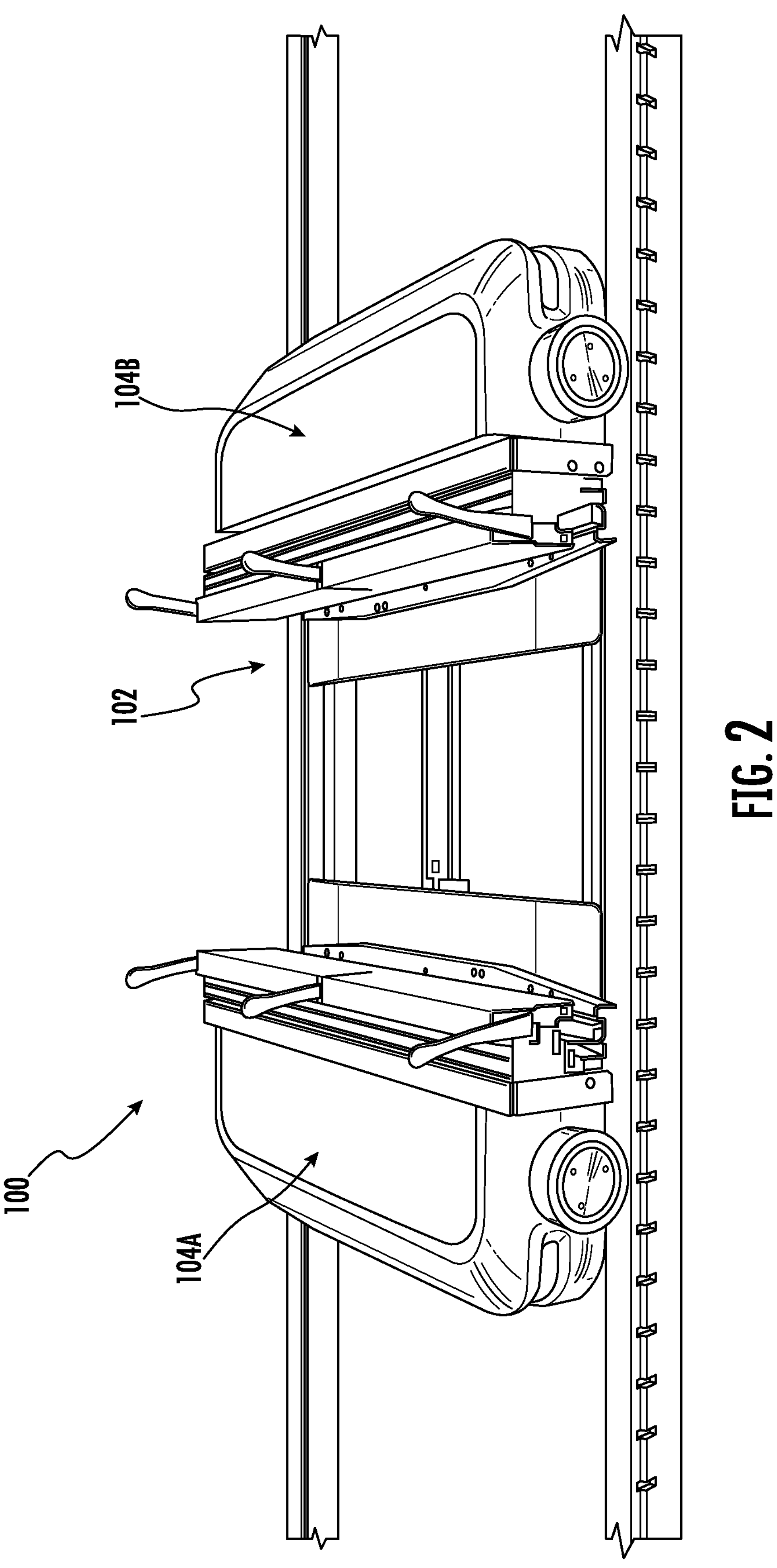
FIG. 2 is a second angled view of an example shuttle car assembly in accordance with various embodiments of the present disclosure.

Example Systems, Apparatuses, and Methods for Quick and Toolless Installation of a Shuttle Car Housing FIGS. 1 and 2 are angled view of example shuttle car assemblies 100 in accordance with various embodiments of the present disclosure. In some embodiments, a shuttle car assembly 100 may include a shuttle car body 102 and a shuttle car housing 104. In some embodiments, as will be described in greater detail later in this disclosure, the shuttle car housing 104 is operably attached to the shuttle car body 102. In some embodiments, the shuttle car housing 104 may be disposed over at least a portion of the shuttle car body 102. In some embodiments, the shuttle car housing 104 houses one or more of the operating components of the shuttle car body 102. In some embodiments, and as shown in at least FIGS. 1 and 2, the shuttle car assembly 100 may include multiple shuttle car housings.

Figure 3:
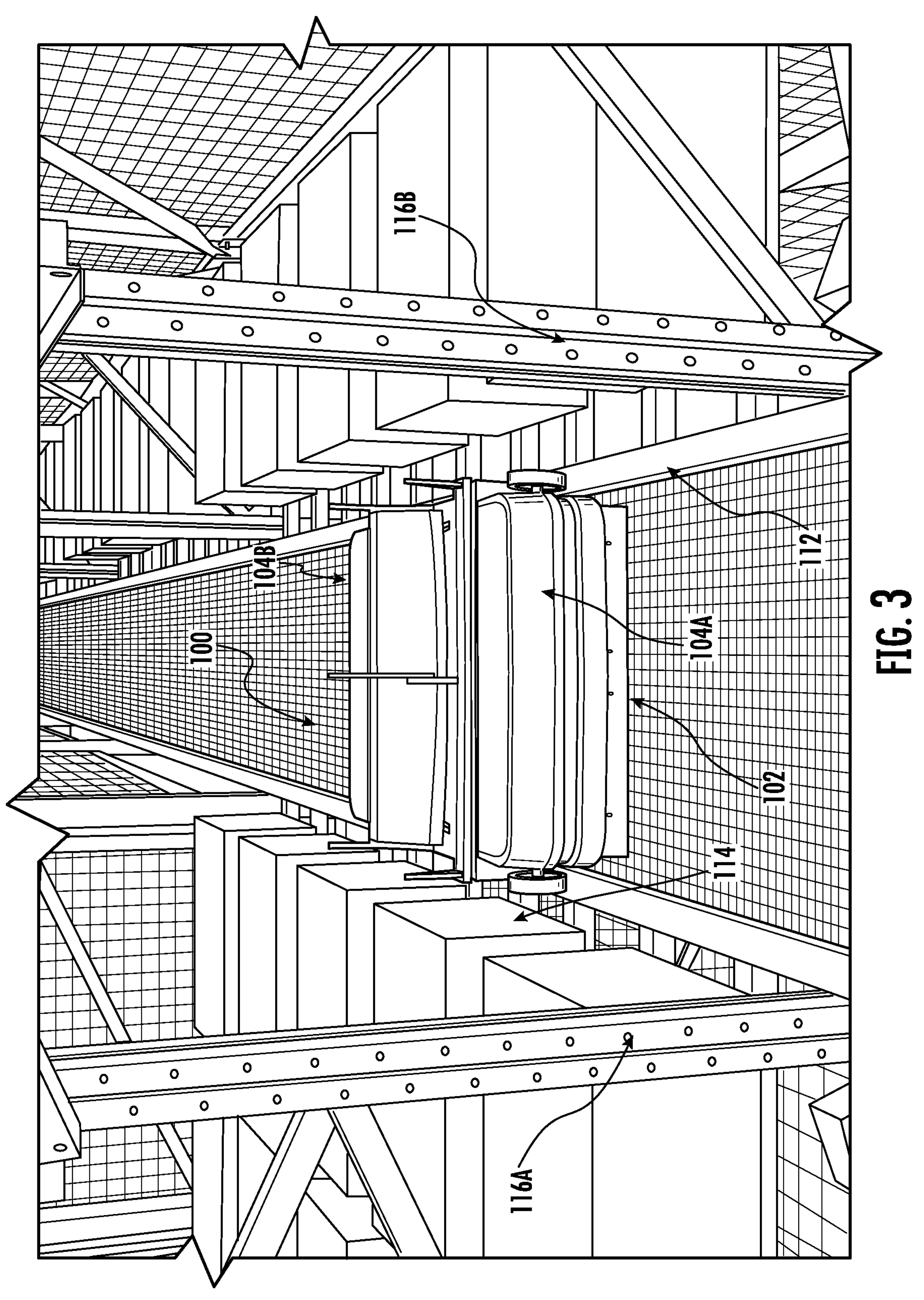
FIG. 3 illustrates an example shuttle car assembly in an example warehouse environment in accordance with various embodiments of the present disclosure.

FIG. 3 shows an angled view of an example shuttle car assembly 100 in an example warehouse environment. The shuttle car assembly 100 has been configured to run on a track 112. As previously disclosed, the track 112 runs adjacent to one or more storage units 116A. In some embodiments, the shuttle car assembly 100 may be configured to support one or more objects 114. In some embodiments, the objects 114 may be positioned on storage units 116A and 116B that are positioned adjacent to or integrated with the track 112. In at least this way, the shuttle car assembly 100 may run along the track 112 adjacent to the storage units 116A-B and receive one or more objects 114 from the storage units 116A-B. In some embodiments, the track 112 may include a void between two opposing rails. In some embodiments, a technician may remove the shuttle car housing and/or reattach the shuttle car housing as describe herein via the void between the opposing rails. The shuttle car body 102 and shuttle car housing 104 will now be described in greater detail.

Figure 4A:
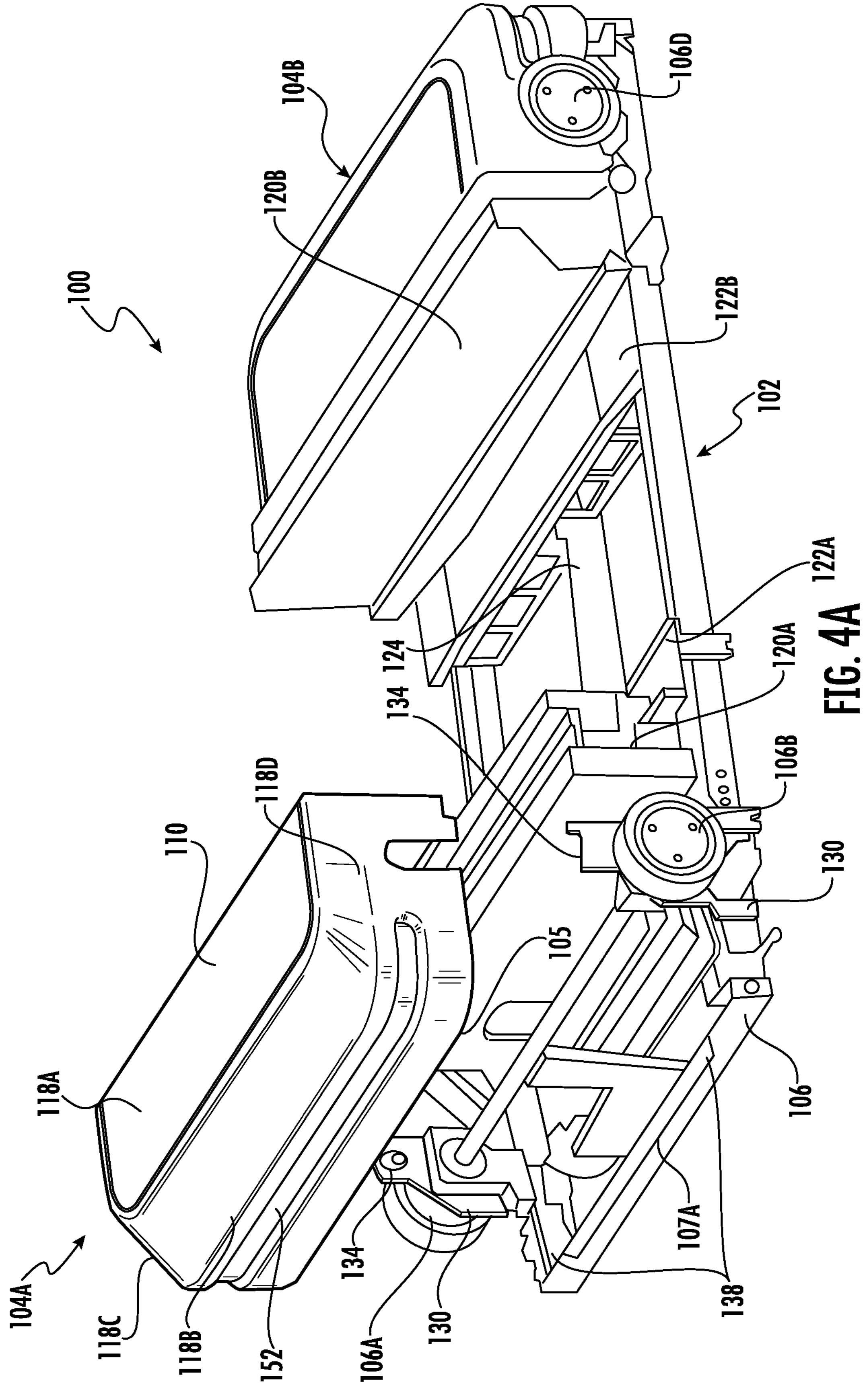
FIG. 4A is an exploded view of an example shuttle car assembly in accordance with various embodiments of the present disclosure.

FIG. 4A shows an exploded view of an example shuttle car assembly 100. In some embodiments, the shuttle car body 102 may include a chassis 106. In some embodiments, the chassis 106 may be a rigid frame for the shuttle car body 102. In some embodiments, the chassis may support various components of the shuttle car assembly 100. In some embodiments, the chassis 106 may comprise metal such as steel or aluminum or of a composite material. In some embodiments, the shuttle car body 102 may include one or more wheels 106A, 106B, 106C, and 106D that may be attached to the chassis 106. In some embodiments, the chassis 106 may have a front bumper 107A and a rear bumper 107B. In some embodiments, one or more of the toolless attachment body attachments described in this disclosure may be defined on and/or configured to engage the front and/or rear bumpers 107A, B. In some embodiments, one or more of the front and rear bumpers 107A, B may be configured to contact at least a portion of the shuttle car housing 104. It will be understood that, in some embodiments, a shuttle car body 102 may have greater than four wheels and, in other embodiments, may have fewer than four wheels. In some embodiments, the one or more wheels 106A-D may be configured to drive along a track 112 (as shown in at least FIG. 3). In some embodiments, the shuttle car body 102 may include one or more operating components. In some embodiments, the one or more operating components may be disposed on the chassis 106. The operating components may include one or more hydraulic pumps and an electric motor that drives the hydraulic pumps. In some embodiments, the shuttle car housing 104 may include a shell 110. In some embodiments, the shell 110 may comprise a plurality of connected surfaces, including a top surface 118A, front surface 118B, two opposed side surfaces 118C and 118D, and/or a rear surface 118E. It will be understood that the shuttle car housing 104 may have a shell 110 comprising more or fewer surfaces than those. For example, the rear surface 118E may be removed (such as in FIG. 6D). In various embodiment herein, the shell 110 may comprise a single, integrally molded piece or may comprise two or more pieces attached, whether permanently or temporarily, to each other. In some embodiments, the rear surface 118A may be chosen based on the type of object being supported by the shuttle car body 102. In some embodiments, the front surface 118B may be slightly curved. In some embodiments, the shell 110 may be a single component, while in other embodiments the sides 118A-E may be separate components that have been attached. In some embodiments, a lighting element 152 may be disposed on the front surface 118B. In some embodiments, the lighting element 152 may be an LED light. In some embodiments, the lighting element 152 may be configured to change color (e.g., to red) wen an operating component needs repair. In some embodiments, the shuttle car housing 104 may have a lower portion, such as a lip 105, that may be configured to contact either the front or the rear bumper 107A, 107B. In some embodiments, the shuttle car body 102 may have one or more holding surfaces 120A, 120B that may abut the shell 110. In some embodiments, the holding surfaces 120A-B may be configured to hold one or more objects as it they are supported by the shuttle car assembly 100. In some embodiments, the shuttle car body 102 may include one or more support surfaces 122A and 122B that may be configured to support one or more objects when they are transported by the shuttle car assembly 100. In some embodiments, the support surfaces 122A, 122B may be positioned perpendicular to the support surfaces 122A, 122B. In some embodiments, the support surfaces 122A, B may be fixedly connected to the chassis 106. In some embodiments, the chassis 106 may include a central rail 124 that is fixedly attached to and connects the support surfaces 122A, B. In some embodiments, and as alluded to above, there may be variations in the aforementioned components between the housings 104A, 104B, as shown in FIGS. 1 and 2. For example, the rear surfaces 118E may be different between the two housings 104A, 104B.

In some embodiments, the shuttle car body 102 may include one or more toolless car attachments and the shuttle car housing 104 may include one or more toolless housing attachments. In some embodiments, the car attachments and the shell attachments may be configured to engage with each other and thereby operatively connect the shuttle car body 102 to the shuttle car housing 104. These attachments may take a variety of forms, may be positioned in a variety of locations, and may encompass a variety of orientations, according to various embodiments. These various embodiments will now be described.

In some embodiments, the one or more toolless car attachments and the one or more toolless body attachments may be self-aligning mechanisms. In some embodiments, the self-aligning mechanisms may be guide slots 128 and mounting plates 130. In some embodiments, the self-aligning mechanisms may comprise any other one or more centering mechanisms that direct an engaging component into a receiving component in a precise, repeatable position. In some embodiments, the one or more toolless car attachments and the one or more toolless body attachments may be tension latching mechanisms. In some embodiments, the tension latching mechanisms may be latches 132 and catches 134. In some embodiments, the catches 134 may be roller catches. In some embodiments, the one or more toolless car attachments and the one or more toolless body attachments may be fastening mechanisms. In some embodiments, the fastening mechanisms may include any type of fastener configured to engage a corresponding receiver or any other removable, rigid attachment, such as, but not limited to, screws 136 and screw holes 138. In some embodiments, the screws 136 may be any suitable screws that be installed without tools, such as thumb screws, bolts with wingnuts, or the like. In some embodiments, the one or more toolless car attachments and the one or more toolless body attachments may be non-tension attachment mechanisms, such as pin attachment mechanisms. In some embodiments, the pin attachment mechanisms may be dowels 140 and dowel holes 142.

Figure 4B:
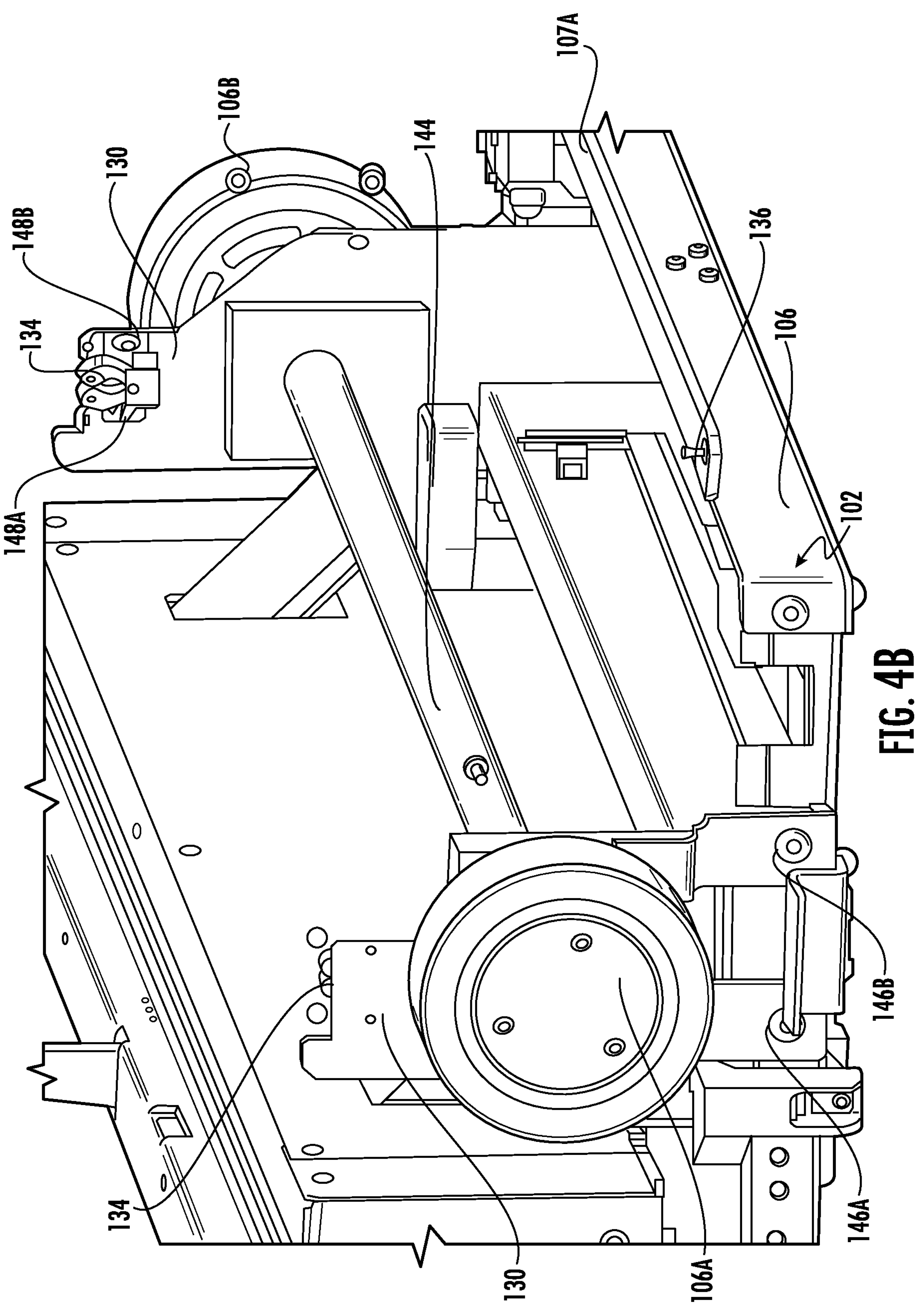
FIG. 4B is a first angled view of example mounting plates and roller catches for an example shuttle car housing in accordance with various embodiments of the present disclosure.
Figure 4C:
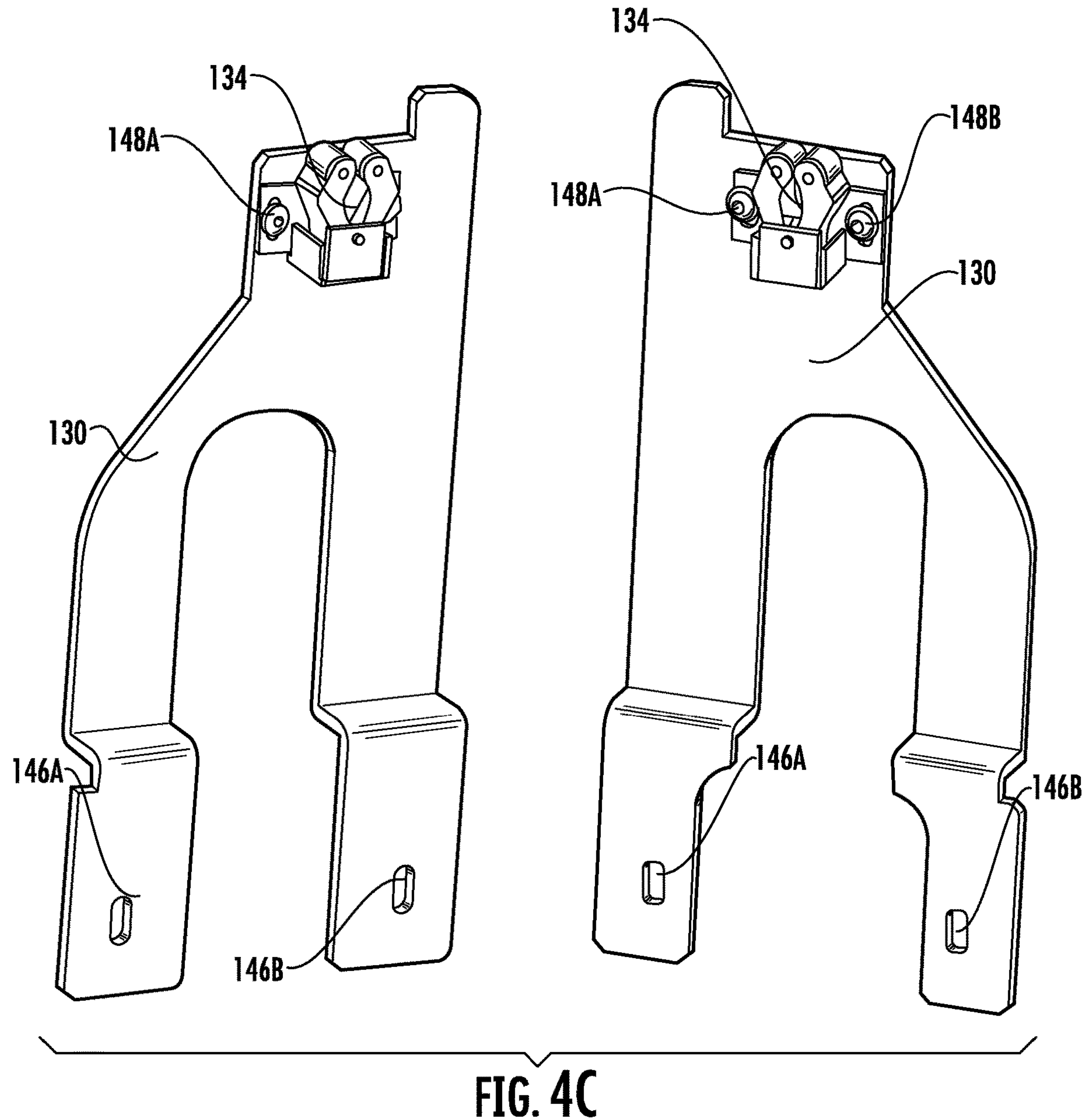
FIG. 4C is a second angled view of example mounting plates and roller catches for an example shuttle car housing in accordance with various embodiments of the present disclosure.

Referring now to FIGS. 4B and 4C, mounting plates 130 and catches 134 are highlighted. In some embodiments, the mounting plates 130 may be disposed in parallel on a left and right side of the shuttle car body 102. In other embodiments, catches 134 may be disposed on the mounting plates 130 and similarly disposed in parallel on the body 102. However, it will be understood that, in some embodiments, the shuttle car body 102 may have the mounting plates 130 only and not the catches, and vice-versa. It will further be understood that, in some embodiments, the mounting plates and catches 130, 134 may be disposed on the shuttle car housing 104. In some embodiments, the mounting plates 130 may have a forked design with a slot between the forks that enables an operable connection to an axle 144 of the shuttle car body 102. This may also be referred to as a fillet design. In some embodiments, the shuttle car housing 104 may be disposed over at least a portion of the axle 144 of the shuttle car body 102. In some embodiments, the mounting plates 130 may be aligned along the axle 144 along with the wheels 106A-B of the shuttle car body 102. In some embodiments, the mounting plates 130 may include one or more holes 146A, 146B that align with corresponding holes on the chassis 106 and through which fastening mechanisms (such as bolts or screws) may be driven to attach the mounting plates 130 to the chassis 106. In other embodiments, the mounting plates may be attached by other means to the body 102, such as by friction fitting the mounting plates 130 on the axle 144, by welding the plates 130 to the body 102, and/or by applying an adhesive to the mounting plates 130 and the body 102. However, it will be understood that, in some embodiments, similar connections may be made between the mounting plates 130 and the shell 110 of the shuttle car housing 104. In some embodiments, the mounting plates 130 may comprise a metal (such as steel or aluminum), plastic, or a composite material. As will be described in greater detail later in this disclosure, the mounting plates 130 may be slidably connected to the guide slots 128, thereby securing the shuttle car body 102 to the shuttle car housing 104, while also allowing for toolless detachment of the shuttle car housing 104 from the body 102.

Still referring to FIGS. 4B and 4C, in some embodiments, the catches 134 may be connected to the mounting plates 130 by one or more holes 148A, 148B that align with corresponding holes on the mounting plate 130 and through which fastening mechanisms (such as bolts or screw) may be driven to attach the catches 134 to the mounting plates 130. In some embodiments, the catches 134 may be attached to the mounting plates 130 by other means, such as by applying an adhesive to the catches 134 and the mounting plates or by welding the catches 134 to the mounting plates. As with the other toolless attachment mechanisms, the catches 134 may be attached to the shuttle car housing instead of the shuttle car body. Furthermore, in some embodiments, the catches 134 may be attached to the shuttle car body 102 without the mounting plates (e.g., the catches 134 may be attached to another component of the body 102). As will be described in greater detail later in this disclosure, the catches 134 may be slidably connected to the latches 132, thereby securing the shuttle car body 102 to the shuttle car housing 104, while also allowing for toolless detachment of the shuttle car housing 104 from the body 102.

Figure 4D:
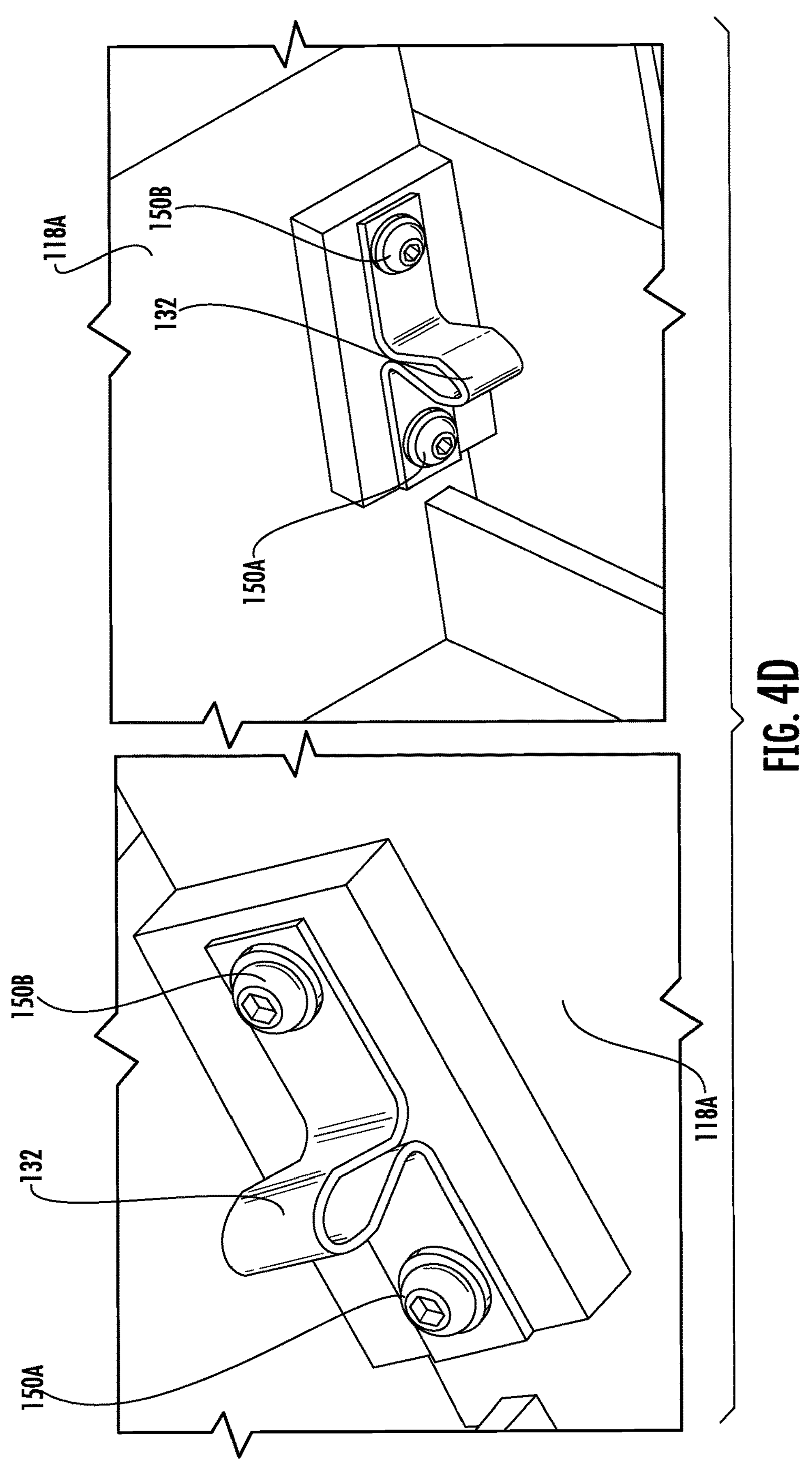
FIG. 4D is an angled view of example latches for an example shuttle car housing in accordance with various embodiments of the present disclosure.

Referring now to FIG. 4D, latches 132 are highlighted. In some embodiments, the latches 132 may be disposed on the shell 110 of the shuttle car housing 104. In some embodiments, the latches 132 may each include one or more holes 150A, 150B that may align with corresponding holes on the shell 110 of the shuttle car housing 104 through which one or more fasteners may be driven (e.g., screws or bolts) to secure the latches 132 to the shell 110 of the housing 104. Various other attachment methods may be used to secure the latches to the shuttle car housing 104, such as friction fitting, adhering, or welding. In some embodiments, the latches 132 may operably connect to one or more catches 134 on the shuttle car body 102 when a technician slides the shuttle car housing 102 onto the shuttle car body 104. In some embodiments, the latches 132 may be on the shuttle car body 102 instead of (or in addition to) the shuttle car housing 104. In those embodiments, one or more catches 134 would be disposed on the shuttle car housing 104 to "catch" the latches on the shuttle car body 102. In some embodiments, and as will be described in greater detail later in this disclosure, the latches 132 and guide slots 128 may be aligned with one or more catches 134 and the mounting plates 130, respectively, and form multiple operably connections between the shuttle car housing 104 and the shuttle car body 102 when a technician slidably attaches the shuttle car housing 104 to the shuttle car body 102.

Figure 4E:
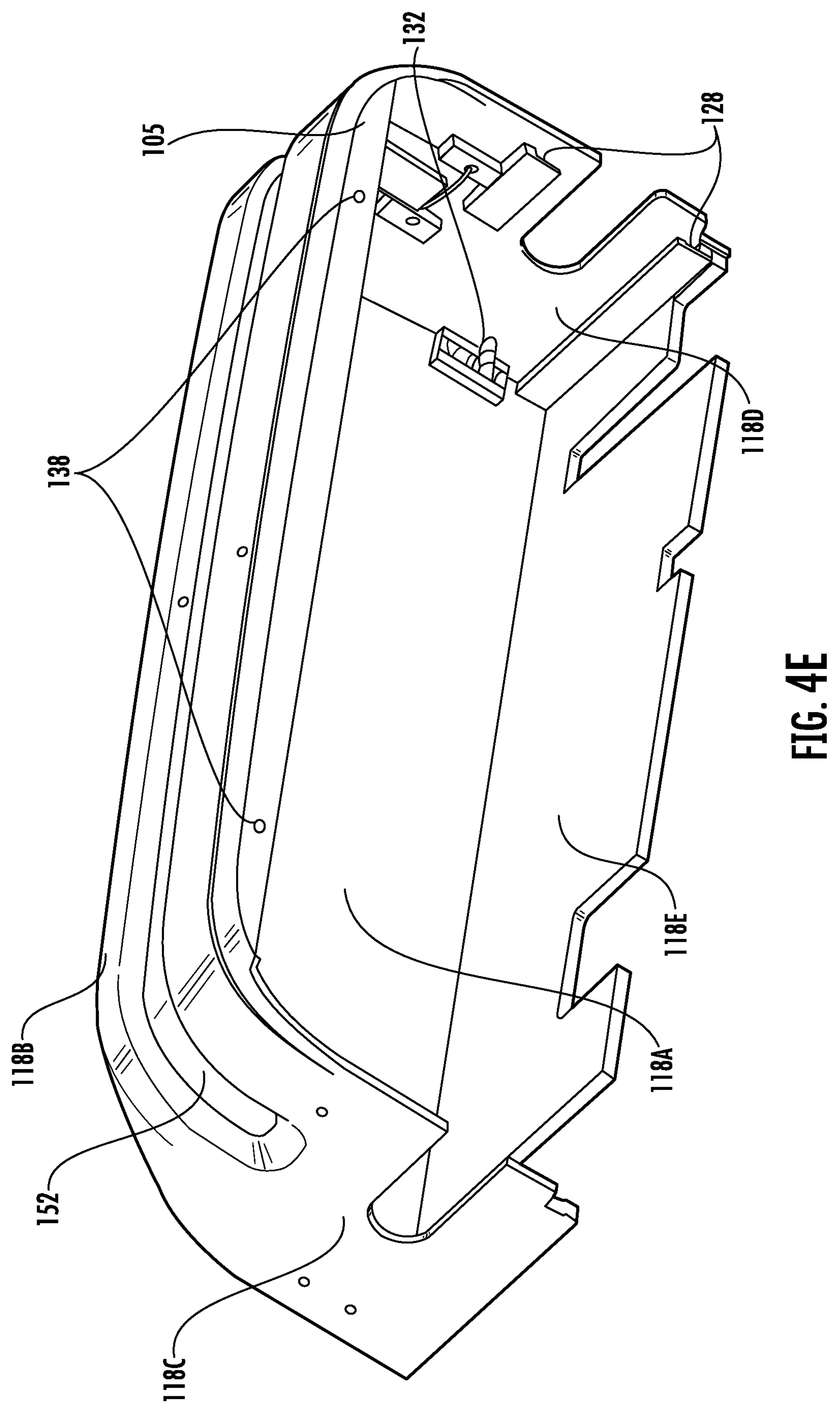
FIG. 4E is an angled bottom view of an example shuttle car housing in accordance with various embodiments of the present disclosure.
Figure 4F:
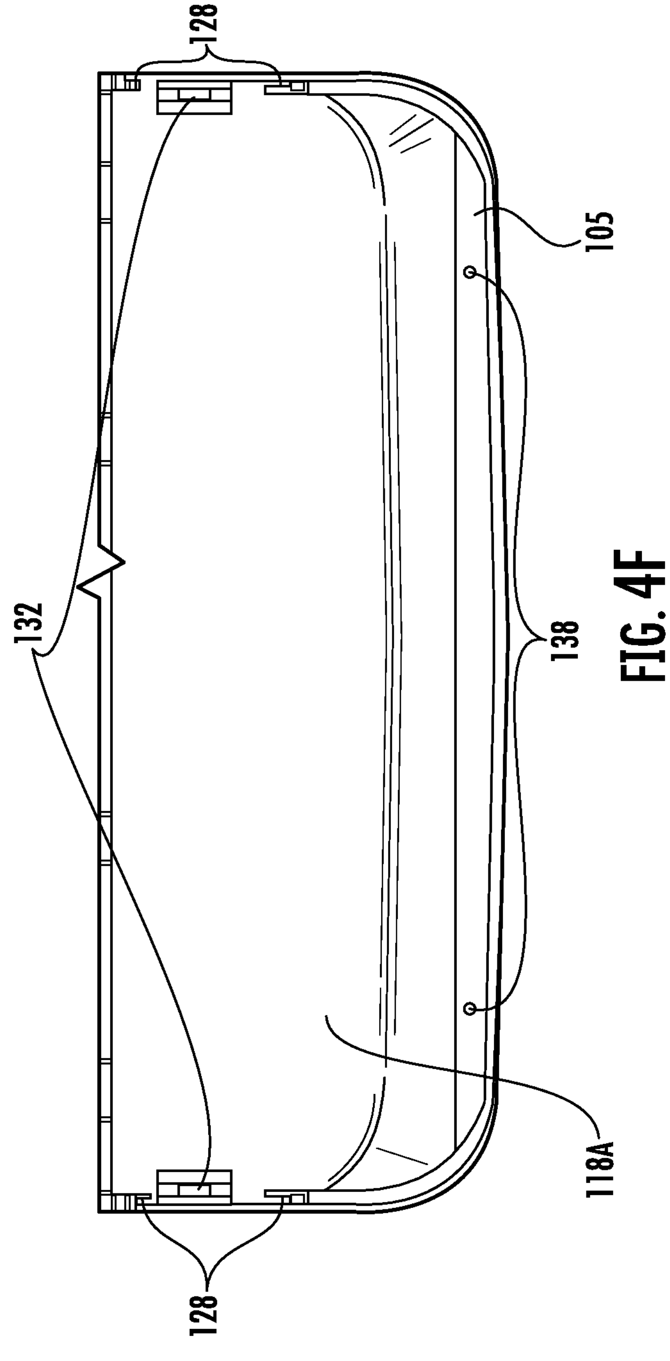
FIG. 4F is a first bottom view of an example shuttle car housing assembly in accordance with various embodiments of the present disclosure.
Figure 4G:
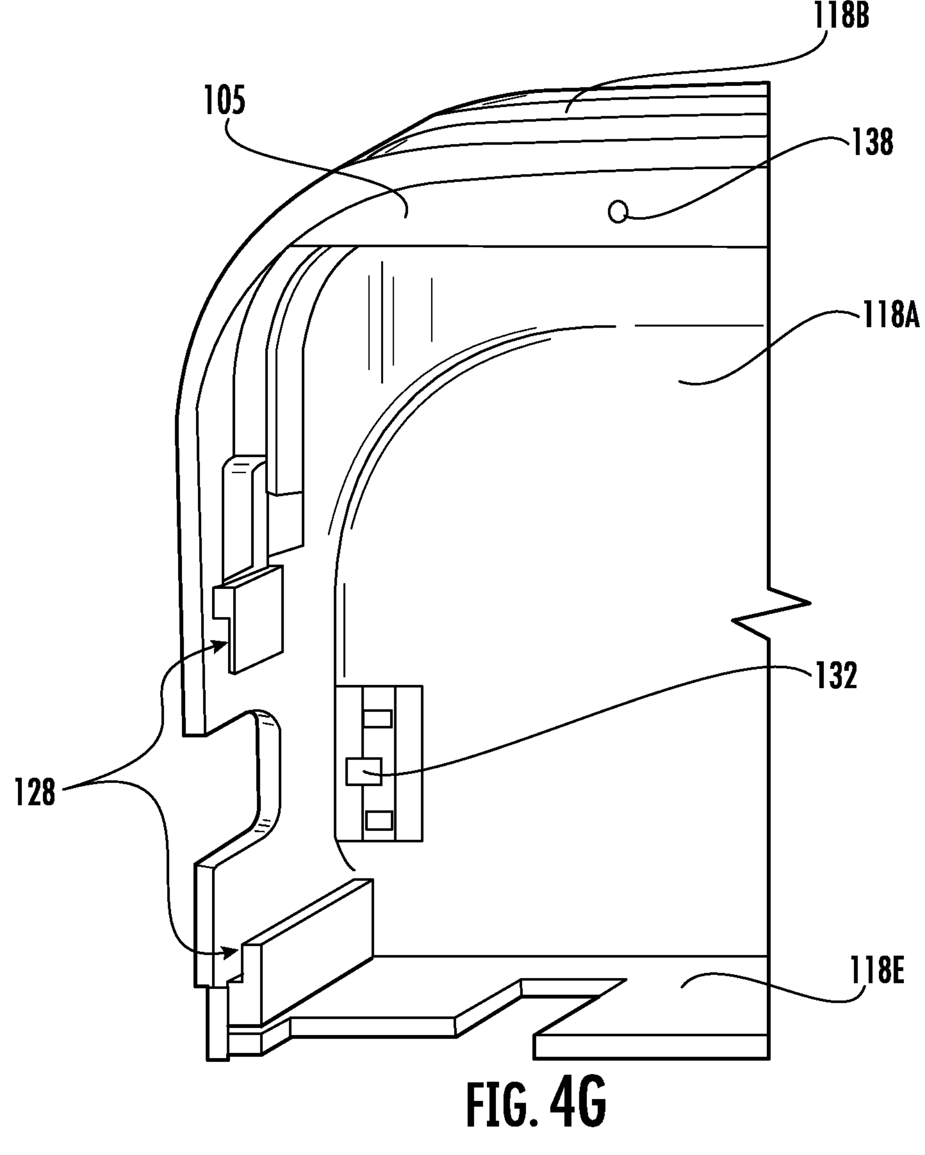
FIG. 4G is a second bottom view of an example shuttle car housing assembly in accordance with various embodiments of the present disclosure.

Referring now to FIGS. 4E, 4F, and 4G, in some embodiments, the guide slots 128 and latches 132 are disposed on the inside of the shell 110. In some embodiments, screw holes 138 are also disposed on the shell 110, on the lip 105. Corresponding screw holes 138 may be disposed on the front bumper 107A and/or the rear bumper 107B of the shuttle car body 102. In some embodiments, the lip 105 and the front or rear bumper 107A, B may be aligned such that the screw holes 138 are aligned. In some embodiments, the guide slots 128 may be aligned with the mounting plates 130 and configured to be operably connected to the mounting plates 130 when a technician slidably attaches the shuttle car housing 104 to the shuttle car body 102. In some embodiments, the guide slots 128 may be attached to the shell 110 by means of an adhesive. In some embodiments, the latches 132 may be aligned with the catches 134 on the shuttle car body 102 and configured to be operably connected to the catches 134 when the shuttle car housing 104 is slidably attached to the shuttle car body 102. In some embodiments, the screw holes 138 of the shuttle car housing 104 may be aligned with corresponding screw holes on the shuttle car body 102. It will be understood that, in some embodiments, these toolless attachments may be reversed between the shuttle car body 102 and the shuttle car housing 104. For example, the catches 134 may be disposed on the shell 110 while the latches 132 are disposed on the shuttle car body 102.

In some embodiments, and as shown in at least FIGS. 1, 2, 3, and 4A, the shuttle car assembly 100 may include a second shuttle car housing. For example, in at least FIGS. 1 and 2, the shuttle car assembly 100 is shown with two housings, referred to as 104A and 104B for clarity. In some embodiments, the first shuttle car housing 104A may be disposed on a first end of the shuttle car body 102 and the second shuttle car housing 104B may be disposed on a second end of the shuttle car body 102. Each of the shuttle car housings 104A, B may at least partially house a first and second plurality of operating components of the shuttle car body 102.

Figure 5A:
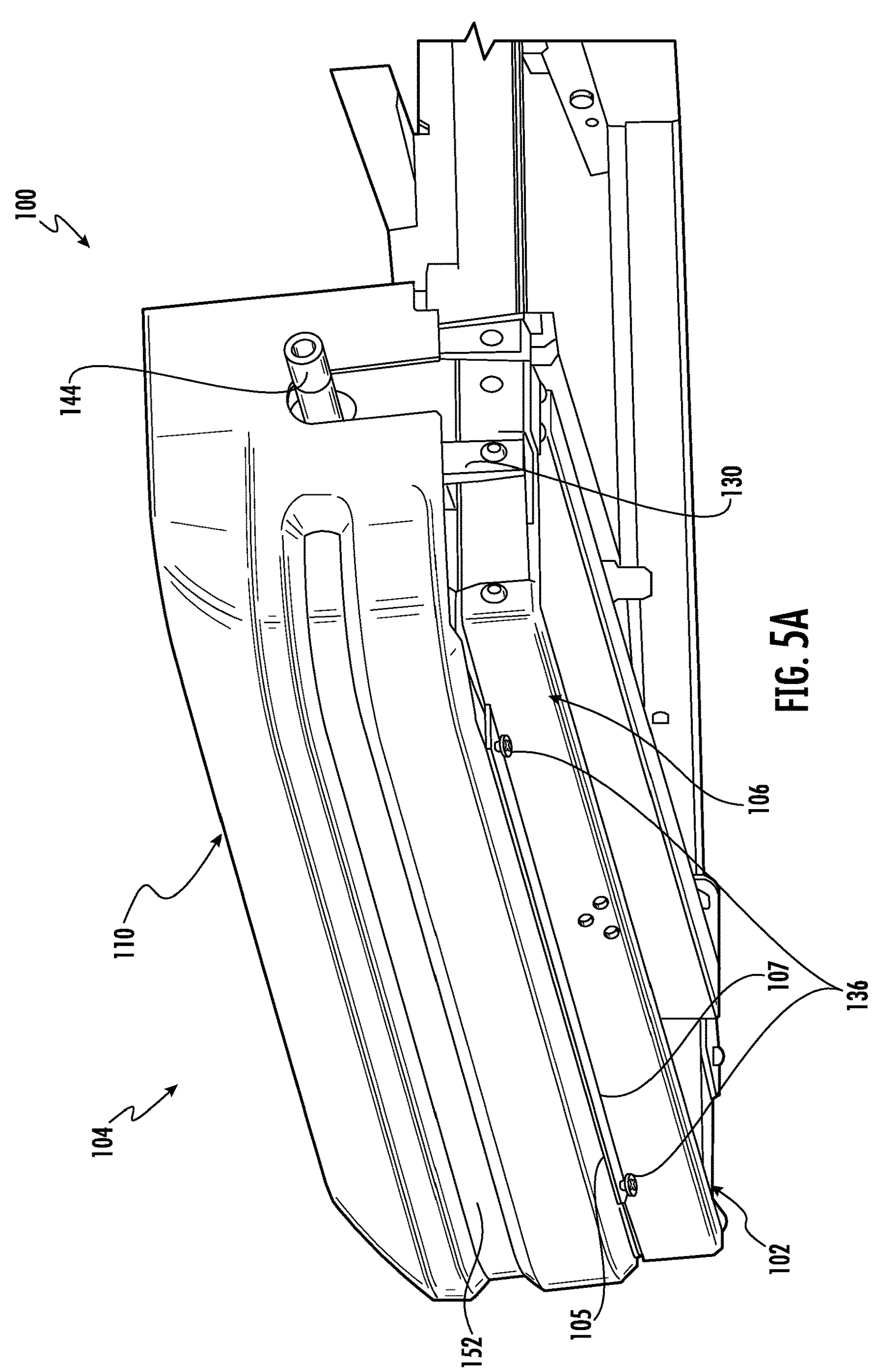
FIG. 5A is an angled view of an example shuttle car housing in accordance with various embodiments of the present disclosure.
Figure 5B:
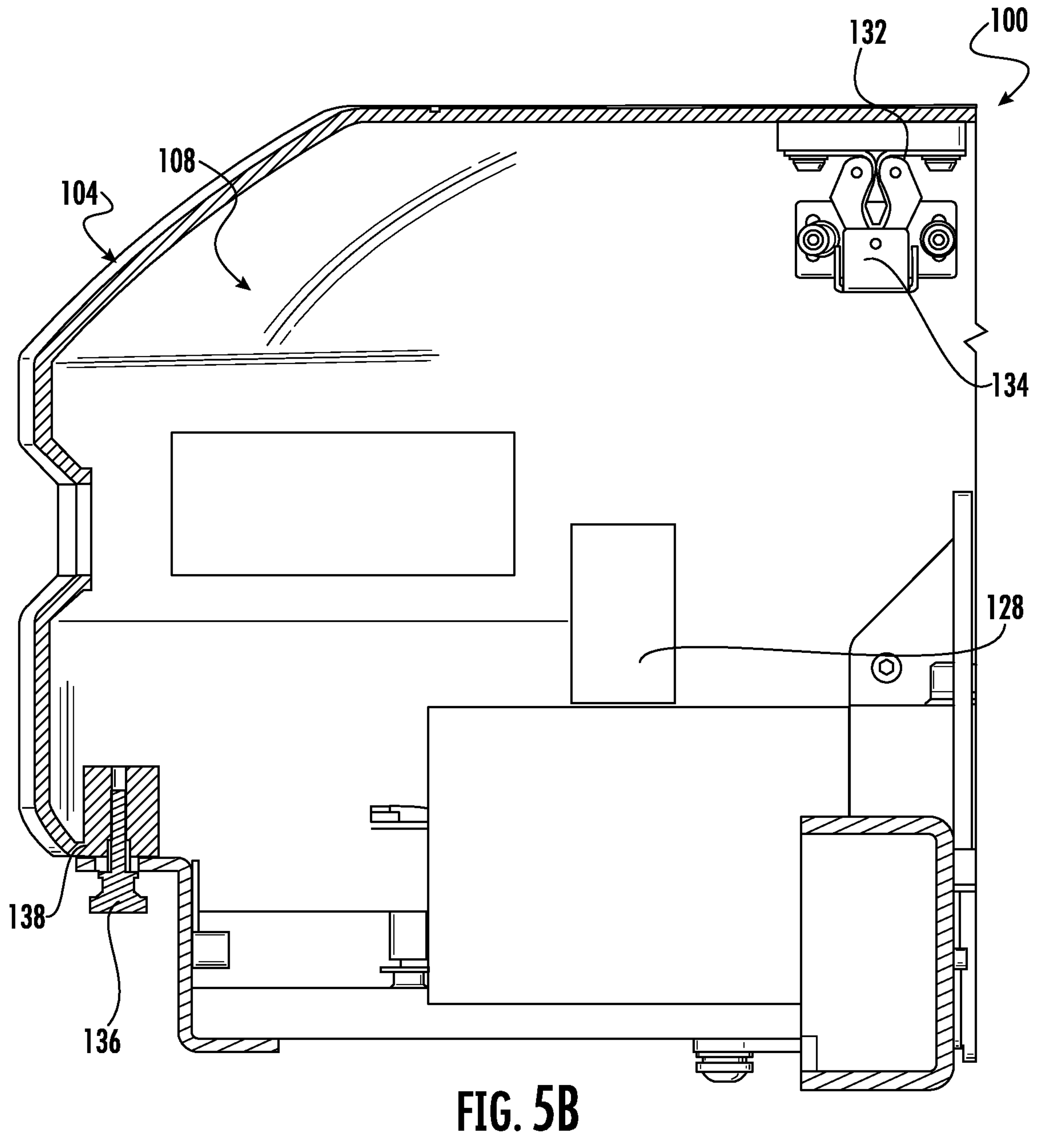
FIG. 5B is a cross-sectional view of an example shuttle car housing in accordance with various embodiments of the present disclosure.

Referring now to FIGS. 5A and 5B, in some embodiments, the shuttle car housing 104 has been installed on the shuttle car body 102 to make the shuttle car assembly 100. FIG. 5B shows an interior, cross-sectional view of the shuttle car housing 104. In FIGS. 5A and 5B, the wheels 106A-B have been removed from the axle 144. In some embodiments, when the shuttle car body and housing 102, 104 are in the position shown in FIGS. 5A and 5B, the toolless body attachments and toolless housing attachments may be operably connected. For example, the screws 136 have been inserted into the aligned screw holes 138 of the shuttle car housing 104 and the shuttle car body; the latches 132 have been operably connected to the catches 134; and the mounting plates 130 have been operably connected to the guide slots 128. It will be understood that these toolless attachments may be interchanged between the body 102 and housing 104. For example, while the mounting plates 130 are attached to the body 102 in FIG. 5A, in some embodiments, the mounting plates 130 may be attached to the housing 104 and the guide slots may be attached to the body 102. As shown in FIG. 5B, the catch 134 and the latch 132 have been operably connected. FIG. 5B also shows the screws 136 inserted into the screw holes 138, as well as the mounting plates 130 and the guide slots 128 operably connected. Once a technician has slidably attached the housing 104 to the body 102 as in FIGS. 5A and 5B, the toolless attachments have been operably connected, and the housing 104 will remain fixed to the body 102 until a technician detaches the housing 104 from the body. A technician may detach the housing 104 by, for example, unscrewing the screws 136 and applying sufficient force to disengage the toolless attachments from each other.

Referring to FIG. 6A-6E, in some embodiments, the toolless attachments of the shuttle car body 102 and the housing 104 may include non-tensioning attachment mechanisms, such as pin attachment mechanisms, such as dowels 140 and dowel holes 142. In some embodiments, the dowel 140 may form a friction fit connection when it is slidable connected to the dowel hole 142 by a technician. While the dowels 140 are connected to the housing 104 in FIGS. 6A-6D (though note that they aren't shown in FIG. 6A), they may instead be attached to the body 102, in some embodiments, and the holes 142 may be a part of the housing 104. In some embodiments, the dowel 140 and/or a latch 132 may be disposed on a plate 154 that is attached to the shell 110. In some embodiments, the dowels 140 may comprise metal such as steel or aluminum, plastic, composites, or wood. In some embodiments, the dowels 140 may be a tapered shaft, with the tapered end being inserted into the dowel hole 142. In some embodiments, the dowels 140 may be configured to compress when inserted into the dowel holes 142 and then expand upon insertion thereby forming a friction fit to operably connect the housing 104 with the body 102. In some embodiments, and as shown in FIGS. 6D and 6E, the dowels 140 may be disposed in close proximity to the latches 132. In some embodiments, a technician may align the dowels 140 with the dowel holes 142 and the latches 132 with the catches 134, then slidably connect the housing 104 to the body 102, thereby forming an operable attachment between the dowels 140 and the dowel holes 142 and between the latches 132 and the catches 134. Similarly, as shown in FIG. 6D, the guide slots 128 may be similarly aligned with the latches 132 and the dowels 140 such that each of these toolless attachments are connected, respectively, to mounting plates 130, catches 134, and dowel holes 142. In some embodiments, the housing 104 may include one or more protrusions 164A, 164B, 164C, and 164D that may be positioned symmetrically on the opposed side surfaces 118C, 118D of the shell 110. In some embodiments, the protrusions 164A, 164B, 164C, and 164D may define hooks, ledges, or other similar shapes for engaging a portion of the shuttle car body. Such protrusions may also function as self-aligning mechanisms. In some embodiments, the protrusions may be configured to operably connect to the shuttle car body 102.

In some embodiments, and as shown in at least FIG. 6A, the shuttle car assembly 100 may include a load handling device (LHD) support 162. In some embodiments, the LHD support may be fixed and one or more catches 134 may be mounted on the LHD support. In some embodiments, the LHD support 162 may be flexible. In some embodiments, the LHD support may be configured to aid in the support provided by the shuttle car body 102. In some embodiments, the LHD support 162 may be disposed within the housing 104, while in other embodiments it may be not disposed within the housing 104 or only partially disposed within the housing 104.

Referring now to FIGS. 7A, 7B, and 7C, angled and cross-sectional views of an example shuttle car assembly 100 in a first position are shown. In some embodiments, the "first position" may refer to a position where a technician has aligned the shuttle car housing 104 and the shuttle car body 102 and their various toolless attachments but has not yet slidably attached the shuttle car housing 104 to the shuttle car body 102. In this position, a technician may have aligned one or more of the screw holes 138 for each of the body 102 and the housing 104, the latches 132 with the catches 134, the dowels 140 with the dowel holes 142, and the guide slots 128 with the mounting plates 130. As has been discussed previously in this disclosure in detail, these toolless attachments may be interchanged between the body 102 and the housing 104. In some embodiments, one or more diagrams may be on the shuttle car body 102 and/or the housing 104 to indicate when the attachments are appropriately aligned. In some embodiments, and as shown in at least FIG. 7C, the screws 136 (or similar fastening mechanism) may also be fixedly attached to and held in place by a screw block 166. In some embodiments, the screw block 166 may be piece of substantive material with an orifice configured to receive the screw 136. In some embodiments, by engaging the screw 136, the screw block 166 may improve the fixed attachment of the shuttle car body 102 to the shuttle car housing 104.

Referring now to FIGS. 8A, 8B, and 8C, angled and cross-sectional views of an example shuttle car assembly 100 in a second position are shown. In some embodiments, the "second position" may refer to a position where a technician has aligned the shuttle car housing 104 and the shuttle car body 102 and their various toolless attachments and has slidably attached the shuttle car housing 104 to the shuttle car body 102. In some embodiments, the screw holes 138 have been aligned and screws 136 (or similar fastening mechanisms) have been driven through them, the latches 132 have been operably attached to the catches 134, the mounting plates 130 have been operably attached to the guide slots 128, and the dowels 140 have been operably attached to the dowel holes 142. In this orientation, the housing 104 has been operably attached to the body 102 such that the shuttle car assembly 100 may traverse a warehouse or other industrial environment while the operating components are secured within the housing 104. Furthermore, a technician may remove the housing 104 from the body 102 without tools by unscrewing the screws 136 (or similar fastening mechanisms), and applying sufficient force to disengage the latches 132 from the catches, the mounting plates 130 from the guide slots 128, and the dowels 140 from the dowel holes 142. It will be understood that the housing 104 may be securely attached to the body 102 with one or more of these toolless attachments. For example, an example housing 104 may be attached to the body 102 by just the guide slots 128 with the mounting plates 130, or by just the guide slots 128 and the latches 132 with the mounting plates 130 and the catches 134.

One example tool free installation of the housing 104 onto the body 102 will now be described. The following steps are described with reference to FIGS. 7A-7C (with the housing 104 in a first position) and FIGS. 8A-8C (with the housing in a second position). In some embodiments, a first step may be a technician inserting mounting plates 130 into the guide slots 128. During this step, the mounting plates 130 and the guide slots 128 must be aligned by the technician. Similarly, the latches 132 and the catches 134 must be aligned, along with the screw holes 138 of each of the housing 104 and the body 102 and the dowels 140 and dowel holes 142. In some embodiments, a second step may be the technician pressing on both sides of the housing 104 to ensure that the latches 132 are secured to the catches 134. In some embodiments, a third step may be fastening screws (or similar fasteners) through the aligned screw holes 138.

FIG. 9 is an angled view of an example shuttle car housing with an example current collector 158 in accordance with various embodiments of the present disclosure. In some embodiments, the current collector 158 may be attached to the shuttle car body 102, as shown in FIG. 9, though in some embodiments the current collector 158 may be attached to the housing 104. In some embodiments, the current collector 158 may be attached to the chassis 106. In some embodiments, the current collector 158 may be an electric current collector configured to provide electricity to one or more operating components of the shuttle car assembly 100. In some embodiments, the current collector 158 may gather electricity needed to run the shuttle car assembly 100 as the shuttle car assembly 100 moves along the tracks 112. In some embodiments, the current collector 158 may be configured to collect current from a contact wire, which, in some embodiments, may provide direct current and in other embodiments may provide single phase alternative current.

The shuttle car assembly 100 may include a variety of toolless attachments, and technicians may utilize this variety of toolless attachments to make a variety of connections between the shuttle car body 102 and the shuttle car housing 104. According to various embodiments, to form a fixed attachment between the body 102 and the housing 104, a technician will insert a fastener (such as a screw 136) into the aligned holes 138 of the body and the housing 102, 104. In addition to making a fixed attachment with the fastening mechanism, a technician may, according to various embodiments, also make a slidable attachment between one or more self-aligning mechanisms, an operable attachment by one or more tensioning mechanisms, and a pin attachment by one or more non-tensioning mechanisms. In some embodiments, the various attachment mechanisms may be collectively aligned. For example, one or more self-aligning mechanisms may be aligned in a first vertical plane while one or more tensioning mechanisms are aligned in a second vertical plane, with these planes being parallel to each other. To give another non-limiting example, a guide slot 128 may be defined on the housing 104 while a mounting plate 130 is defined on the body 102, and the guide slot 128 and the housing 130 may be aligned in a first vertical plane; moreover, a tension latching mechanism such as a latch 132 may be defined on the housing 104 and may be aligned in a second vertical plane with a catch 134 defined on the body 102; and, in this example, the first and second vertical planes may be parallel.

Referring now to FIGS. 10A-10F, in some embodiments, the shuttle car assembly 100 may include one or more magnetic attachment mechanisms as a type of toolless attachments on the body and/or housing. The one or more magnetic attachment mechanisms may be a type of tension latching mechanism. In some embodiments, the magnetic attachment mechanisms may include one or more magnets 160 and one or more metal sheets 170. In some embodiments, and as shown in FIG. 10A, the magnet 160 may be disposed on the shuttle car housing 104, but it will be understood that one or more magnets 160 may also be disposed on the shuttle car body 120, in addition to or as an alternative to being disposed on the shuttle car housing 104. In some embodiments, and as shown in FIG. 10A, the one or more magnetic attachment mechanisms may include one or more metal sheets 170. It will be understood that the metal sheet 170 may be disposed on the shuttle car housing 104, on the shuttle car body 102, or on both assemblies. In some embodiments, the magnetic attachment mechanism(s) may include a magnet and a metal sheet and/or may include multiple magnets configured to removably engage each other.

Referring now to FIGS. 10A-10D, the magnet 160 may form a magnetic attachment with the metal sheet 170. In some embodiments, the magnetic attachment mechanism(s) may be used with one or more alignment mechanisms. In some embodiments, and also as shown in FIGS. 10A-10D, the magnet and metal sheet 160, 170 may be disposed such that they are aligned along a vertical axis that is parallel to the vertical axis along which the dowel 140 and dowel hole 142 are aligned. In some embodiments, the metal sheet 170 may be connected to a bracket 168 (e.g., by screws or other fasteners). In some embodiments, the bracket 168 may include the dowel hole 142. In some embodiments, the bracket 168 may be attached to the shuttle car housing 104. A technician may form a non-tensioning attachment (e.g., a pin attachment) with the dowel 140 and dowel hole 142 and a magnetic attachment with the magnet 160 and the metal sheet 170 simultaneously. No tools are required to form the magnetic attachment between the magnet 160 and the metal sheet 170. In some embodiments, the magnetic attachment mechanism(s) may be connected by sliding the shuttle car housing 104 onto the shuttle car body 102 such that the magnet 160 and the metal sheet 170 are in close enough proximity that the magnetic attraction between the two components is strong enough that they are drawn to each other and form a magnetic attachment. It will be understood that various compositions of magnets 160 and metal sheets 170 may be used, depending on the desired strength of the magnetic attachment between the two components. It will be understood that the metal sheet 170 and the dowel hole 142 are shown without the shuttle car body in FIGS. 10A-10D for illustrative purposes only and to highlight the attachment between the various components. The gradual magnetic connection between the magnet 160 and the metal sheet 170 is shown progressing from FIGS. 10A-10D. In some embodiments, the magnetic attachment mechanism may be disposed on an inboard side of the shuttle car body (e.g., closer to the center of the body), and one or more additional toolless attachment mechanisms may be disposed on other locations of the shuttle car body (e.g., thumbscrews along the outer ends of the housing.

Referring now to FIGS. 10E-10F, the magnet 160 and the metal sheet 170 may be used to form a magnetic attachment in one or more additional configurations. In some embodiments, and as shown in at least FIGS. 10E and 10F, the metal sheet 170 is disposed on a mounting plate 130, while the magnet 160 is disposed on the shuttle car housing 104. In some embodiments, the metal sheet 170 may be disposed on the shuttle car housing 104 while the magnet 160 is disposed on the mounting plate 130. As shown in FIGS. 10E and 10F, the mounting plate 130 and guide slot 128 may be aligned along a vertical axis that is parallel to a vertical axis along which the magnet 160 and the metal sheet 170 are aligned. Though not shown, it will be understood that a dowel 140 and dowel hole 142 (as in FIGS. 10A-10D) may also be aligned along their own vertical axis, which may similarly be parallel to both the vertical axis along which the magnet and metal sheet 160, 170 are aligned, and the vertical axis along which the mounting plate 130 and guide slot 128 are aligned.

FIG. 11 is a flow chart illustrating an example method 200 for installation of an example shuttle car housing in accordance with various embodiments of the present disclosure. The method 200 is described with reference to the assembly 100 and its various components as previously disclosed. However, it will be understood that the method 200 may be performed with any suitable system and components. In some embodiments, the method 200 may include a step 202 of securing a first toolless attachment of the one or more toolless housing attachments of the shuttle car housing to a first toolless body attachment of the one or more toolless body attachments of the shuttle car body. For example, in some embodiments, step 202 may comprise slidably attaching one or more self-alignment mechanisms, such as mounting plates and guide slots. In other embodiments, step 202 may comprise fixedly attaching the shuttle car body to the shuttle car housing by one or more fasteners, such as screws. In some embodiments, the method 200 may include an additional step of pressing on one or more sides of the shuttle car housing. In some embodiments, the method 200 may include an additional step of securing a second toolless attachment of the one or more toolless housing attachments of the shuttle car housing to a second toolless body attachment of the one or more toolless body attachments of the shuttle car body.

Many modifications and other embodiments of the disclosure set forth herein will come to mind to one skilled in the art to which this disclosure pertains having the benefit of the teachings presented in the foregoing descriptions and the associated drawings. Therefore, it is to be understood that the disclosure is not to be limited to the specific embodiments disclosed and that modifications and other embodiments are intended to be included within the scope of the appended claims. Although specific terms are employed herein, they are used in a generic and descriptive sense only and not for purposes of limitation.

The invention claimed is:

1. A shuttle car assembly comprising:

a shuttle car body configured to support one or more objects, the shuttle car body comprising:

a chassis;

one or more wheels connected to the chassis;

one or more operating components connected to the chassis;

one or more toolless body attachments; and a shuttle car housing configured to at least partially house the one or more operating components of the shuttle car body, the shuttle car housing comprising:

a shell comprising a top surface, a front surface, and two opposed side surfaces; and one or more toolless housing attachments, wherein the one or more toolless body attachments and the one or more toolless housing attachments are configured to engage to operatively connect the shuttle car body and the shuttle car housing, wherein the one or more toolless body attachments and the one or more toolless housing attachments comprise at least one tension latching mechanism, wherein the at least one tension latching mechanism comprises at least one latch disposed on one of the shuttle car body or the shuttle car housing and at least one catch disposed on the other of the shuttle car body or the shuttle car housing, and wherein the at least one latch is configured to engage with the at least one catch.

2. The shuttle car assembly of claim 1, wherein the one or more toolless body attachments and the one or more toolless housing attachments comprise self-aligning mechanisms configured to align the shuttle car housing and the shuttle car body during engagement.

3. The shuttle car assembly of claim 1, wherein a first latch of the at least one latch and a first catch of the at least one catch are oriented along a shared vertical axis such that the first latch and the first catch are configured to engage with each other vertically when the shuttle car body is slidably engaged with the shuttle car housing.

4. The shuttle car assembly of claim 1, wherein the one or more toolless body attachments and the one or more toolless housing attachments comprise one or more fasteners configured to fixedly attach the shuttle car body and the shuttle car housing.

5. The shuttle car assembly of claim 4, wherein the one or more fasteners comprise one or more screws, wherein the one or more screws are configured to fixedly attach the shuttle car body and the shuttle car housing by extending through one or more holes in one of the shuttle car body or the shuttle car housing and thread into one or more screw holes in the other of the shuttle car body or the shuttle car housing.

6. The shuttle car assembly of claim 1, wherein the one or more toolless body attachments and the one or more toolless housing attachments comprise one or more non-tension attachment mechanisms, wherein the one or more non-tension attachment mechanisms comprise one or more pin attachment mechanisms comprising at least one pin of one of the shuttle car body or the shuttle car housing configured to insert into at least one hole of the other of shuttle car body or the shuttle car housing.

7. The shuttle car assembly of claim 1, wherein the one or more toolless body attachments or the one or more toolless housing attachments comprise at least one fastening mechanism, wherein the at least one fastening mechanism comprises a fastener configured to engage a receiver to fixedly attach the shuttle car body and the shuttle car housing.

8. The shuttle car assembly of claim 7, wherein the at least one fastening mechanism comprises two fastening mechanisms, wherein the at least one tension latching mechanism comprises two tension latching mechanisms, and wherein each of the two fastening mechanisms is configured to be disposed closer to an end of the shuttle car assembly than each of the two tension latching mechanisms.

9. The shuttle car assembly of claim 1, wherein the shuttle car body comprises a bumper, wherein the one or more toolless body attachments are defined on the bumper, and wherein at least a portion of the shuttle car housing is configured to contact the bumper.

10. The shuttle car assembly of claim 1, wherein the shuttle car housing is configured to be disposed over at least a portion of an axle of the shuttle car body.

11. The shuttle car assembly of claim 1, further comprising a second shuttle car housing, wherein the shuttle car housing is configured to be disposed at a first end of the shuttle car body and is configured to at least partially house a first plurality of operating components of the one or more operating components of the shuttle car body, wherein the second shuttle car housing is configured to be disposed at a second end of the shuttle car body and is configured to at least partially house a second plurality of operating components of the one or more operating components of the shuttle car body.

12. A shuttle car housing for a shuttle car assembly, the shuttle car housing comprising:

a shell comprising a top surface, a front surface, and two opposed side surfaces; and one or more toolless housing attachments, wherein;

the one or more toolless housing attachments are configured to operatively connect to one or more toolless body attachments of a shuttle car body to at least partially house one or more operating components of the shuttle car body, the one or more toolless body attachments and the one or more toolless housing attachments comprise at least one tension latching mechanism, the at least one tension latching mechanism comprises at least one latch disposed on one of the shuttle car body or the shuttle car housing and at least one catch disposed on the other of the shuttle car body or the shuttle car housing, and the at least one latch is configured to engage with the at least one catch.

13. The shuttle car housing of claim 12, wherein the one or more toolless housing attachments are configured to operatively connect to the one or more toolless body attachments of the shuttle car body without requiring tools.

14. The shuttle car housing of claim 12, wherein the one or more toolless housing attachments comprise one or more self-aligning components configured to operatively connect to one or more self-aligning components of the one or more toolless body attachments of the shuttle car body.

15. The shuttle car housing of claim 12, wherein the one or more toolless housing attachments comprise one or more fastening mechanisms comprising one of a fastener or a receiver configured to operatively connect to the other of the fastener or the receiver of the one or more toolless body attachments of the shuttle car body.

16. The shuttle car housing of claim 15, wherein the one or more toolless housing attachments comprise at least one thumbscrew.

17. A method of toolless installation of a shuttle car housing to a shuttle car body, the method comprising securing one or more toolless housing attachments of the shuttle car housing to one or more toolless body attachments of the shuttle car body, wherein the shuttle car body comprises:

a chassis;

one or more wheels connected to the chassis;

one or more operating components connected to the chassis; and the one or more toolless body attachments, and wherein the shuttle car housing comprises:

a shell comprising a top surface, a front surface, and two opposed side surfaces; and the one or more toolless housing attachments, wherein:

the one or more toolless body attachments and the one or more toolless housing attachments comprise at least one tension latching mechanism, the at least one tension latching mechanism comprises at least one latch disposed on one of the shuttle car body or the shuttle car housing and at least one catch disposed on the other of the shuttle car body or the shuttle car housing, and the at least one latch is configured to engage with the at least one catch.

18. The method of claim 17, wherein the one or more toolless body attachments or the one or more toolless housing attachments comprise at least one fastening mechanism, wherein the at least one fastening mechanism comprises a fastener configured to engage a receiver to fixedly attach the shuttle car body and the shuttle car housing.

* * * * *